(12) United States Patent
Sundararajan et al.

(10) Patent No.: US 11,589,290 B2
(45) Date of Patent: *Feb. 21, 2023

(54) ROUTING MODIFICATION BASED ON HANDOVER DETECTION

(71) Applicant: QUALCOMM INCORPORATED, San Diego, CA (US)

(72) Inventors: Jay Kumar Sundararajan, San Diego, CA (US); Manu Sharma, Sunnyvale, CA (US); Arnaud Meylan, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/727,507

(22) Filed: Dec. 26, 2019

(65) Prior Publication Data
US 2020/0169934 A1 May 28, 2020

Related U.S. Application Data

(63) Continuation of application No. 14/268,786, filed on May 2, 2014, now Pat. No. 10,560,887.
(Continued)

(51) Int. Cl.
*H04W 40/36* (2009.01)
*H04W 36/14* (2009.01)
(Continued)

(52) U.S. Cl.
CPC .......... *H04W 40/36* (2013.01); *H04W 36/00* (2013.01); *H04W 36/0069* (2018.08);
(Continued)

(58) Field of Classification Search
CPC ..... H04W 36/08; H04W 40/36; H04W 76/27; H04W 36/22; H04W 36/00; H04W 36/0069; H04W 40/248
See application file for complete search history.

(56) References Cited

U.S. PATENT DOCUMENTS 8,787,172 B2 7/2014 Klingenbrunn et al.
8,908,636 B2 12/2014 Klingenbrunn et al.
(Continued)

FOREIGN PATENT DOCUMENTS

CN 101854734 A 10/2010
CN 103069911 A 4/2013
(Continued)

OTHER PUBLICATIONS

"3rd Generation Partnership Project; Technical Specification Group Services and System Aspects; IP flow mobility and seamless Wireless Local Area Network (WLAN) offload; Stage 2 (Release 11)", 3GPP Standard; 3GPP TS 23.261, 3rd Generation Partnership Project (3GPP), Mobile Competence Centre; 650, Route Des Lucioles; F-06921 Sophia-Antipolis Cedex; France, vol. SA WG2, No. V11. 0.0, Sep. 17, 2012 (Sep. 17, 2012), pp. 1-22, XP050649116.
(Continued)

*Primary Examiner* — Anez C Ebrahim
(74) *Attorney, Agent, or Firm* — Holland & Hart LLP

(57) ABSTRACT

Methods, systems, and devices are described for routing modification based on handover detection in UEs and network equipment. According to the principles of the present specification, communication between a User Equipment (UE) and a network equipment may be established over a first radio access technology (RAT) and a second RAT, and a coupling between the first RAT and the second RAT may be identified in the communication between the UE and the network equipment. A handover event associated with at least one of the RATs may be identified, and network traffic
(Continued)

routing may be adapted based at least in part on the identified handover event and the coupling between the first RAT and the second RAT.

29 Claims, 13 Drawing Sheets

Related U.S. Application Data

(60) Provisional application No. 61/820,093, filed on May 6, 2013.

(51) Int. Cl.

| | | |
|---|---|---|
| *H04W 40/24* | (2009.01) | |
| *H04W 36/00* | (2009.01) | |
| *H04W 76/27* | (2018.01) | |
| *H04W 36/08* | (2009.01) | |
| *H04W 36/22* | (2009.01) | |
| H04W 88/10 | (2009.01) | |
| H04W 88/06 | (2009.01) | |
| H04W 84/12 | (2009.01) | |

(52) U.S. Cl.
 CPC ............ *H04W 36/08* (2013.01); *H04W 36/14* (2013.01); *H04W 36/22* (2013.01); *H04W 40/248* (2013.01); *H04W 76/27* (2018.02); *H04W 36/0027* (2013.01); *H04W 84/12* (2013.01); *H04W 88/06* (2013.01); *H04W 88/10* (2013.01)

(56) References Cited

U.S. PATENT DOCUMENTS

| | | | |
|---|---|---|---|
| 2005/0073977 A1* | 4/2005 | Vanghi | H04W 36/0066 370/335 |
| 2008/0014957 A1 | 1/2008 | Ore | |
| 2009/0042576 A1 | 2/2009 | Mukherjee et al. | |
| 2009/0180440 A1 | 7/2009 | Sengupta et al. | |
| 2010/0075679 A1 | 3/2010 | Tenny et al. | |
| 2010/0265914 A1 | 10/2010 | Song et al. | |
| 2011/0149909 A1 | 6/2011 | An et al. | |
| 2011/0211559 A1 | 9/2011 | Lim et al. | |
| 2013/0097418 A1* | 4/2013 | Bhatt | H04W 12/001 713/151 |
| 2014/0328318 A1 | 11/2014 | Sundararajan et al. | |
| 2015/0312957 A1 | 10/2015 | Pelletier et al. | |

FOREIGN PATENT DOCUMENTS

| | | |
|---|---|---|
| JP | 2011172231 A | 9/2011 |
| JP | 2015501099 A | 1/2015 |
| WO | WO-2010022374 A1 | 2/2010 |
| WO | WO2010121191 | 10/2010 |
| WO | WO2011159215 A1 | 12/2011 |
| WO | WO2011162782 A1 | 12/2011 |
| WO | WO2011162783 A1 | 4/2013 |
| WO | WO-2013052805 A1 | 4/2013 |
| WO | WO-2013072176 A1 | 5/2013 |
| WO | WO-2014113686 A2 | 7/2014 |

OTHER PUBLICATIONS

International Preliminary Report on Patentability—PCT/US2014/036785, The International Bureau of WIPO—Geneva, Switzerland, dated Nov. 10, 2015.
International Search Report and Written Opinion—PCT/US2014/036785—ISA/EPO—dated Oct. 28, 2014.
QUALCOMM Incorporated : "WLAN/3GPP Radio Interworking Scope and Scenarios", 3GPP Draft; R2-130264 WLAN Interworking Scenarios, 3rd Generation Partnership Project (3GPP), Mobile Competence Centre; 650, Route Des Lucioles ; F-06921 Sophia-Antipolis Cedex; France, vol. RAN WG2, No. St. Julian; Jan. 28, 2013-Feb. 1, 2013, Jan. 18, 2013 (Jan. 18, 2013), XP050688044, Retrieved from the internet.URL:http://www.3gpp.org/ttp/tsg_ran/WG2_RL2/TSGR2_81/Docs/[retrieved on Jan. 18, 2013],pp. 3.
Broadcom Corporation: "Mobility for Dual Connectivity," R2-130990, 3GPP TSG RAN WG2 Meeting #81 bis, Agenda Item 7.2, Chicago, USA, Apr. 15-19, 2013, 6 pages.
Huawei H: "Study of Solutions and Radio Protocol Architecture for Dual-Connectivity", 3GPP TSG-RAN WG2 Meeting #81 bis, R2-131164, Agenda Item 7.2, Chicago, USA, Apr. 15-19, 2013, pp. 1-12.
Nokia: "Handover Principles and UE Capabilities", 3GPP TSG RAN WG2 LTE ad-hoc, Tdoc R2-051735, Agenda Item 3.3, Sophia Antipolis, France, Jun. 20-21, 2005, pp. 1-9.
Nokia Siemens Networks et al., "Data Split Options and Considerations On U-Plane Protocol Architecture For Dual-Connectivity", R2-131054, 3GPP TSG-RAN WG2 Meeting #81 bis, Agenda item: 7.2Chicago, USA, Apr. 15-19, 2013, 9 Pages.

* cited by examiner

ROUTING MODIFICATION BASED ON HANDOVER DETECTION

CROSS REFERENCES

The present Application for Patent is a Continuation of U.S. patent application Ser. No. 14/268,786 by Sundararajan, et al., entitled, "Routing Modification Based on Handover Detection" filed May 2, 2014, which claims priority to U.S. Provisional Patent Application No. 61/820,093 by Sundararajan et al., entitled "Routing Modification Based on Handover Detection", filed May 6, 2013, assigned to the assignee hereof, and expressly incorporated by reference herein.

BACKGROUND

The following relates generally to wireless communication, and more specifically to an aggregation or coupling of disparate radio access technologies (RATs) to communicate data between a user equipment (UE) and network equipment. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with UEs on downstream and upstream links. Each base station has a coverage range, which may be referred to as the coverage area of the cell. In some cases, multiple RAT carriers may be aggregated or coupled to communicate data between a UE and network equipment (e.g., a base station). In these cases, there is a need to provide traffic flow continuity and efficient carrier resource utilization in the event of a handover on one of the RATs.

SUMMARY

The described features generally relate to one or more improved systems, methods, and/or apparatuses for routing modification based on handover detection in UEs and network equipment. According to the principles of the present specification, network communication between a UE and the network equipment may be established over a first radio access technology (RAT) and a second RAT, and a coupling between the first RAT and the second RAT may be identified in the communication between the UE and the network equipment. A handover event associated with at least one of the RATs may be identified, and network traffic routing or a scheduling behaviors may be adapted based at least in part on the identified handover event and the coupling between the first RAT and the second RAT.

According to a first illustrative configuration, a method of wireless communications by a user equipment (UE), may include establishing communication between the UE and a network equipment over a first radio access technology (RAT) and a second RAT. In some examples, the method may further comprise identifying a coupling between the first RAT and the second RAT in the communication between the UE and the network equipment. A handover event associated with at least one of the RATs may be identified. The method may further comprise adapting, by the UE, network traffic routing based at least in part on the identified handover event and the coupling between the first RAT and the second RAT.

In certain examples, a request may be received from the network, requesting the UE to modify a routing of uplink traffic from the UE to the network equipment. In some examples, at least one of the RATs may include a wireless wide area network (WWAN) and the other of the RATs may include a wireless local area network (WLAN). In such networks, the coupling may comprise using a common bearer to convey network traffic for both the first and second RATs to the network equipment. Identifying the coupling between the first RAT and the second RAT may comprise determining that the network traffic between the UE and the network equipment over the first RAT and the second RAT is supported by at least the common bearer. The method may further comprise determining that a handover of the UE indicated by the handover event would affect an ability of the UE to continue communicating network traffic supported by the common bearer over both the first RAT and the second RAT at a current rate.

In some examples, adapting the routing may comprise disengaging the coupling between the first and second RATs when a target of the handover event does not support use of a common bearer to convey traffic for both the first and second RATs. Disengaging the coupling may comprise routing all data traffic associated with the common bearer (that is in use before the handover) over one of the RATs. Additionally or alternatively, adapting the network traffic routing at the UE may comprise modifying an IP-layer routing table stored by the UE based on the identified handover event. Modifying the routing table may be in response to a determination that a target of the handover event supports using common bearer to convey traffic of the UE over both the first RAT and the second RAT.

In yet further examples, adapting the network traffic routing at the UE may comprise modifying at least one sub-IP layer scheduling rule based on the identified handover event. The scheduling rule may be associated with distributing uplink traffic between the UE and the network equipment among the first and second RATs. In some examples, modifying at least one sub-IP layer scheduling rule may be in response to a determination that a target of the handover event supports using a common bearer to convey traffic of the UE received over both the first RAT and the second RAT.

In certain examples, network traffic of the UE may be transmitted to the network equipment over the first RAT and the second RAT in response to a determination that a target of the handover event supports using a common bearer to convey traffic of the UE to a core network. In some examples, a request may be transmitted to the network equipment to modify a routing of downlink traffic from the network equipment to the UE. Additionally or alternatively, a handover may be delayed at the first RAT until after a transmission of pending network traffic routed to the second RAT.

In some examples, modifying a connection of the UE over the second RAT may be in response to a handover of the UE at the first RAT. Modifying the connection between the UE and the network equipment at the second RAT may comprise disassociating the UE from the second RAT, initiating a handover of the UE at the second RAT, or deactivating the second RAT at the UE. In certain examples, wireless traffic may be transmitted and received over a set of ports associated with one of the RATs, and the network traffic routing may be adapted for a subset of the set of ports.

In some examples, identifying the coupling between the first RAT and the second RAT may include determining that network traffic communicated between the UE and the network equipment over the first RAT and the second RAT is supported by at least one same bearer. Identifying the coupling between the first RAT and the second RAT may include identifying a carrier aggregation of at least one carrier of the first RAT with at least one carrier of the second RAT. Additionally or alternatively, identifying the coupling between the first RAT and the second RAT may include determining that the network equipment includes collocated elements associated with each of the RATs. Additionally or alternatively, identifying the coupling between the first RAT and the second RAT may include receiving a unicast message from the network equipment over one of the RATs, the message indicating the coupling between the first RAT and the second RAT. Additionally or alternatively, identifying the coupling between the first RAT and the second RAT may include receiving a broadcast message over at least one of the RATs advertising the coupling between the first RAT and the second RAT.

In certain examples, identifying the handover event may include determining that a neighboring cell comprises a better signal strength than a current serving cell associated with the UE. Additionally or alternatively, identifying the handover event may include receiving at the UE a handover instruction from the network equipment associated with at least one of the RATs. Additionally or alternatively, identifying the handover event may include detecting a radio link failure of a current serving cell associated with the UE. Additionally or alternatively, identifying the handover event may include determining that a quality of service associated with at least one of the RATs has fallen below a threshold. Additionally or alternatively, identifying the handover event may include receiving an indication of the handover event from the network equipment.

According to a second illustrative configuration, a UE apparatus may include means for establishing communication between the UE apparatus and network equipment over a first radio access technology (RAT) and a second RAT; means for identifying a coupling between the first RAT and the second RAT in the communication between the UE apparatus and the network equipment; means for identifying a handover event associated with at least one of the RATs; and means for adapting, by the UE apparatus, network traffic routing based at least in part on the identified handover event and the coupling between the first RAT and the second RAT.

In certain examples, the UE apparatus of the second illustrative configuration may be configured to implement one or more aspects of the functionality described above with reference to the method of the first illustrative configuration.

According to a third illustrative configuration, a user equipment (UE) apparatus may include a first radio associated with a first RAT; a second radio associated with a second RAT; a processor; and a memory in electronic communication with the processor, the memory embodying instructions. The instructions may be executable by the processor to: establish communication between the UE and network equipment over a first radio access technology (RAT) and a second RAT; identify a coupling between the first RAT and the second RAT in the communication between the UE and the network equipment; identify a handover event associated with at least one of the RATs; and adapt network traffic routing based at least in part on the identified handover event and the coupling between the first RAT and the second RAT.

In certain examples, the UE apparatus of the third illustrative configuration may be configured to implement one or more aspects of the functionality described above with reference to the method of the first illustrative configuration.

According to a fourth illustrative configuration, a computer program product, may include a non-transitory computer-readable medium storing instructions executable by a processor to: establish communication between a UE and network equipment over a first radio access technology (RAT) and a second RAT; identify a coupling between the first RAT and the second RAT in the communication between the UE and the network equipment; identify a handover event associated with the at least one of the RATs; and adapt, by the UE, network traffic routing based at least in part on the identified handover event and the coupling between the first and second RATs.

In certain examples, the computer program product of the fourth illustrative configuration may be configured to implement one or more aspects of the functionality described above with reference to the method of the first illustrative configuration.

According to a fifth illustrative configuration, a method of wireless communications by a network equipment, may include establishing communication between the network equipment and a user equipment (UE) over a first radio access technology (RAT) and a second RAT; identifying a coupling between the first RAT and the second RAT in the communication between the network equipment and the UE; identifying a handover event associated with at least one of the RATs; and adapting, by the network equipment, network traffic routing based at least in part on the identified handover event and the coupling between the first RAT and the second RAT.

In certain examples, the network equipment may transmit a request to the UE to modify a routing of uplink traffic from the UE to the network equipment. In some examples, at least one of the RATs may include a wireless wide area network (WWAN) RAT and the other of the RATs may include a wireless local area network (WLAN) RAT.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present specification describes the management of wireless communications by modifying routing of data communicated between a UE and network equipment (e.g., a base station) or scheduling at a sub-IP layer of operation in response to a handover event. When the UE and network equipment use an aggregation or coupling of multiple radio access technologies (RATs), the detection of a handover event (e.g., the occurrence or imminence of a handover at one of the RATs) and the coupling of the RATs may affect network traffic routing for one or both RATs. For example, a UE may aggregate a cellular wireless wide area network (WWAN) carrier and a wireless local area network (WLAN) carrier to communicate with network equipment having collocated WWAN base station and WLAN access point elements. The UE or network equipment may identify a coupling between the WWAN and WLAN carriers in the communication between the UE and the network equipment, and detect a handover event associated with the occurrence or imminence of a WWAN handover of the UE from the network equipment to target network equipment.

For instance, following the WWAN handover event, the WLAN and WWAN carrier may no longer be coupled. As a result, without adaptation of network traffic routing, communication with the core network through the WLAN carrier may be disrupted. In some examples, the adaptation of routing alleviates disruptions to the communication of data between the UE and the core network As a result, based on the detected handover event and the identified coupling between the WWAN carrier and the WLAN carrier, the UE or network equipment may adapt network traffic routing to move traffic currently associated with the WLAN carrier to the WWAN carrier, thereby avoiding disruptions to the communication of data between the UE and a core network.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain examples or illustrations may be freely combined with features described in other examples or illustration.

Figure 1:
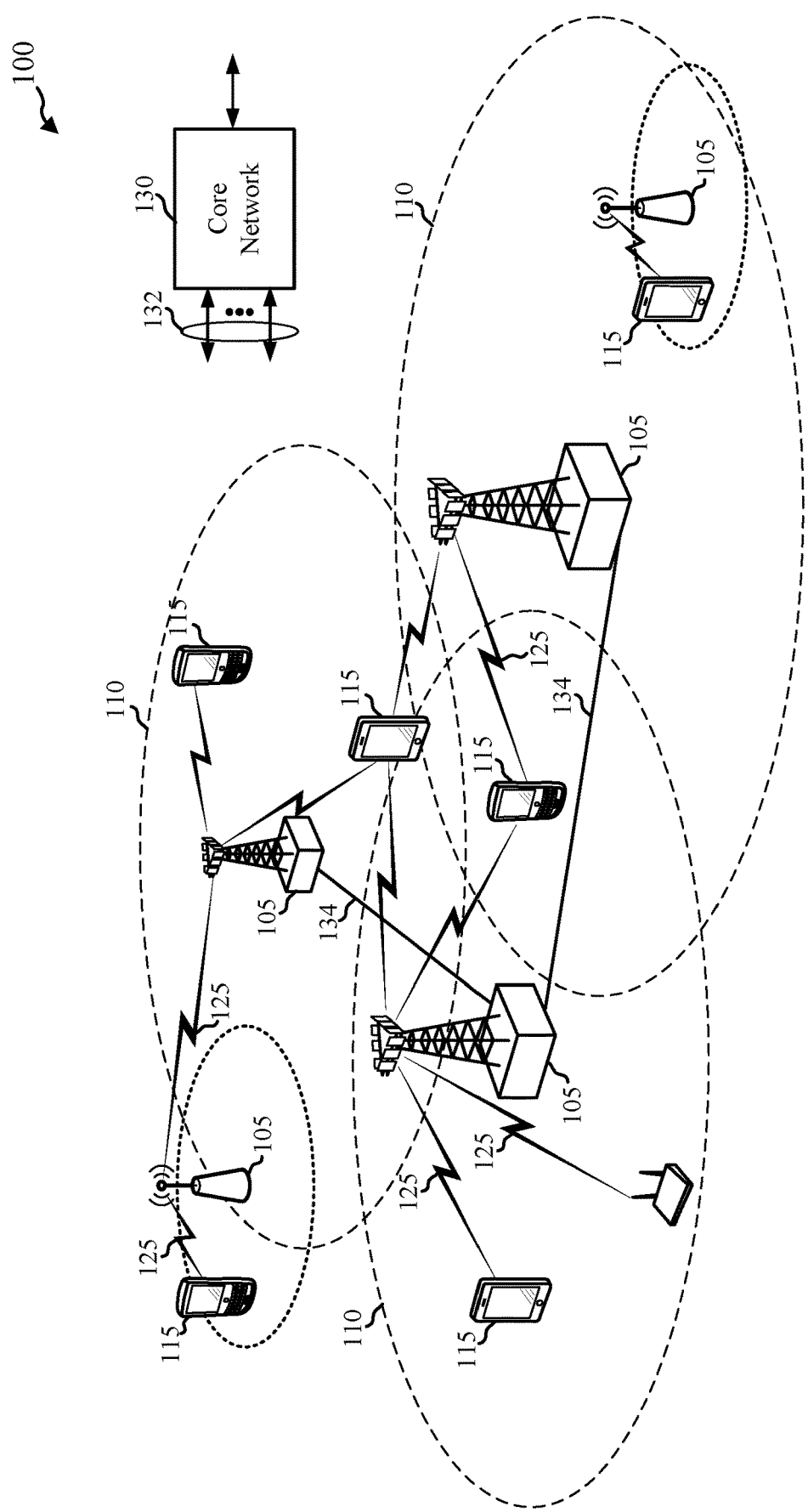
FIG. 1 shows a block diagram of a wireless communications system.

Referring first to FIG. 1, a diagram illustrates an example of a wireless communications system 100. The wireless communications system 100 may include base station network equipment 105, communication User Equipment (UEs) 115, and a core network 130. The base station network equipment 105 may support a number of cells for communicating with the UEs 115 and may be coupled to a core network 130. Base station network equipment 105 may communicate control information and/or user data with the core network 130 through backhaul links 132. In embodiments, the base station network equipment 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base station network equipment 105 may wirelessly communicate with the UEs 115 via one or more base station antennas. Each of the base station network equipment 105 sites may provide communication coverage for a respective geographic coverage area 110. In some embodiments, base station network equipment 105 may be referred to as simply a base station, a base transceiver station, a radio base station, an access point, a radio transceiver, a basic service set (BSS), an extended service set (ESS), a NodeB, an eNodeB (eNB), a Home NodeB, a Home eNodeB, or some other suitable terminology. The geographic coverage area 110 for a base station network equipment may be divided into sectors making up only a portion of the coverage area (not shown). The wireless communications system 100 may include base station network equipment 105 of different types (e.g., macro, micro, and/or pico base stations). There may be overlapping coverage areas for different technologies.

In embodiments, the wireless communications system 100 is an LTE/LTE-A network. In LTE/LTE-A networks, the terms evolved Node B (eNB) and user equipment (UE) may be generally used to describe base station network equipment 105 and mobile devices, respectively. The wireless communications system 100 may be a Heterogeneous LTE/LTE-A network in which different types of eNBs provide coverage for various geographical regions. For example, each base station network equipment 105 may operate as a macro cell, a pico cell, a femto cell, and/or other types of cell or power classifications. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and may provide restricted access to UEs having an association with the femto cell (e.g., UEs in a closed subscriber group (CSG), UEs for users in the home, and the like), open access, or hybrid access. An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base station network equipment 105 via a backhaul link 132 (e.g., S1, etc.). The base station network equipment 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication links 125 shown in the wireless communications system 100 may include uplink (UL) transmissions from a UE 115 to a base station network equipment 105, and/or downlink (DL) transmissions, from a base station network equipment 105 to a UE 115. The downlink transmissions may also be called forward link transmissions while the uplink transmissions may also be called reverse link transmissions.

In certain examples, heterogeneous radio access technologies (RAT) may be available within the wireless communications system such that the UEs 115 may access the core network 130 over an aggregation of different RAT carriers. For example, base station network equipment 105 of the wireless communications system 100 may include both WWAN base station WLAN access point elements. In certain examples, a base station network equipment 105 may include an LTE eNBs element collocated with a WLAN access point element. In additional or alternative example, an LTE eNBs element and WLAN access point element may not be collocated at the base station network equipment 105. Instead, the LTE eNB element and WLAN access point element may be coupled via a fast link. Thus, a multi-RAT base station network equipment 105 may implement both a WWAN base station network equipment 105 and a WLAN access point network equipment 105 to communicate with a UE 115 over separate LTE and WLAN carriers.

Certain base station network equipment 105 may support WWAN-WLAN carrier aggregation such that the base station network equipment 105 may communicate simultaneously with one or more UEs over both the WWAN and WLAN carriers. Such base station network equipment 105 may have a single Radio Link Control (RLC) layer providing packets to be transmitted to the UE 115, and receiving packets from the UE 115, over both the WWAN and the WLAN RATs. As will be described in more detail with respect to the following Figures, a UE and/or base station network equipment 105 supporting the aggregation of WWAN and WLAN RAT carriers may be capable of identifying a handover event associated with at least one of the RATs and adapt network traffic routing (e.g., for at least another one of the RATs) based on the identified handover event.

Figure 2:
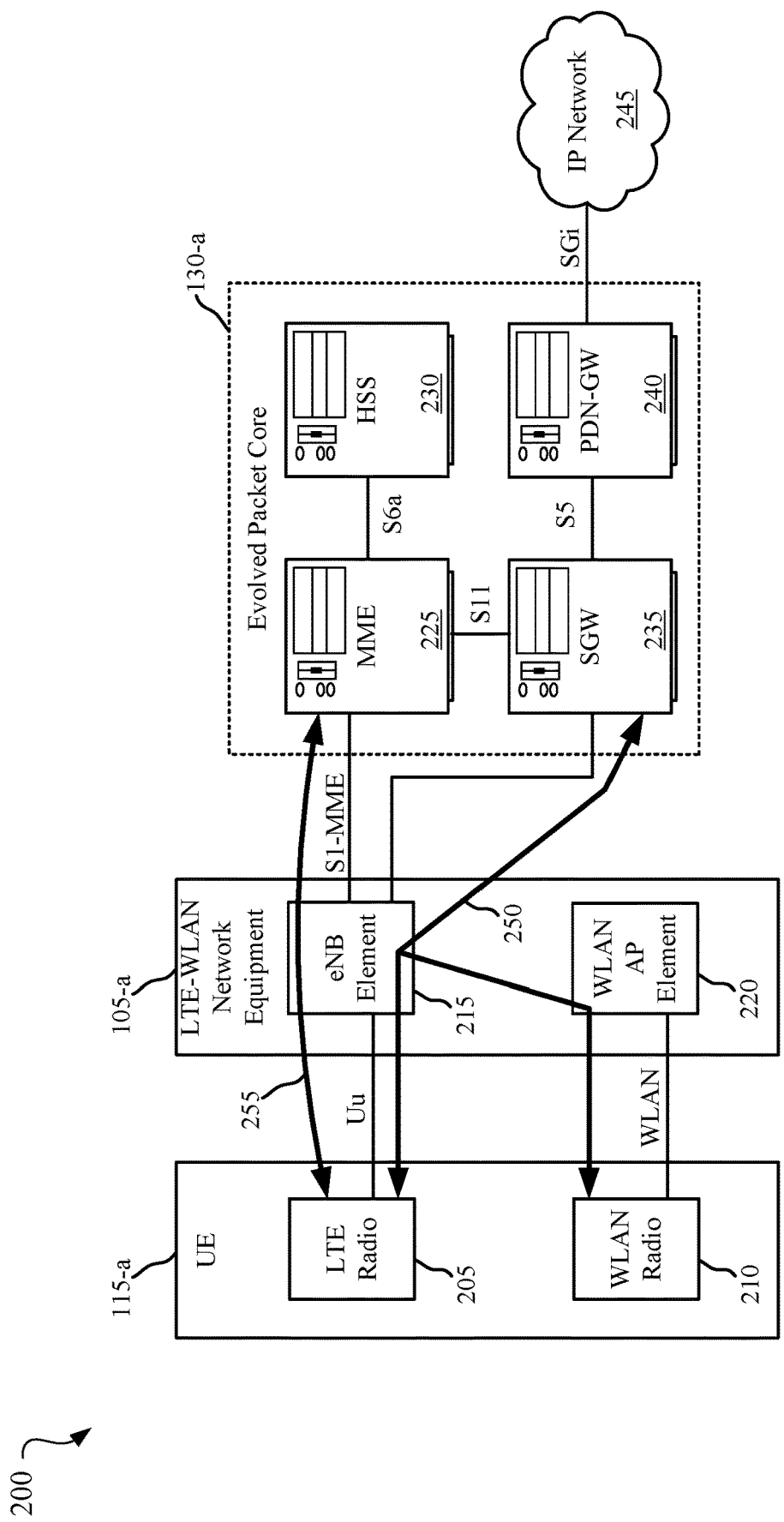
FIG. 2 shows a block diagram of an illustrative wireless communications system that includes an aggregation of multiple RATs to communicate data between a UE and network equipment.

Referring now to FIG. 2, a diagram of a wireless communication system 200 is shown. The wireless communication system 200 may include a UE 115-a, LTE-WLAN base station network equipment 105-a, an evolved packet core (EPC) 130-a, and an IP network 245 (e.g., the Internet and/or an IP network associated with a cellular provider). The UE 115-a, LTE-WLAN base station network equipment 105-a, and EPC 130-a may be respective examples of the UE 115, base station network equipment 105, and core network 130 of FIG. 1.

The LTE-WLAN base station network equipment 105-a may combine and connect the functionality of both an LTE eNB and a WLAN access point. Thus, the LTE-WLAN base station network equipment 105-a may include an eNB element 215 and a WLAN access point element 220. The UE 115-a may communicate with the eNB element 215 of the LTE-WLAN base station network equipment 105-a using an LTE radio 205 and the WLAN access point element 220 of the LTE-WLAN base station network equipment using a WLAN radio 210. While the present example is given in the context of an aggregation of carriers for LTE and WLAN RATs and an EPC 130-a, it will be understood that these principles may be applied to aggregations of carriers for other types of RATs and using other types of core networks 130.

The eNB element 215 and the WLAN access point element 220 may be capable of providing the UE 115-a with access to the evolved packet core 130-a using the aggregation of carriers for the different RATs. Specifically, the eNB element 215 of the LTE-WLAN base station network equipment 105-a may provide access to the evolved packet core 130-a over a Uu interface of LTE or LTE-Advanced access technology defined by the 3rd Generation Partnership Project (3GPP), and the WLAN access point element 220 of the LTE-WLAN base station network equipment 105-a may provide access to the evolved packet core 130-a over WLAN access technology defined by the 802.11 standard from the Institute of Electrical and Electronics Engineers (IEEE).

The evolved packet core 130-a may include a mobility management entity 225, a home subscriber server (HSS) 230, a serving gateway (SGW) 235, and a packet data network (PDN) gateway (PDN-GW) 240, as defined by the Evolved Packet System (EPS) architecture standardized by the 3GPP organization. In some examples, one or more of these nodes may be implemented by the same device.

The MME may be the control node that processes the signaling between the UE 115-a and the EPC 130-a. Generally, the MME 225 may provide bearer and connection management. The MME 225 may, therefore, be responsible for idle mode UE tracking and paging, bearer activation and deactivation, and SGW selection for the UE 115-a. The MME 225 may communicate with the eNB element 215 of the LTE-WLAN base station network equipment 105-a over an S1-MME interface. The MME 225 may additionally authenticate the UE 115-a and implement Non-Access Stratum (NAS) signaling with the UE 115-a.

The HSS 230 may, among other functions, store subscriber data, manage roaming restrictions, manage accessible access point names (APNs) for a subscriber, and associate subscribers with MMES 225. The HSS may communicate with the MME over an S6a interface defined by defined by the Evolved Packet System (EPS) architecture standardized by the 3GPP organization.

All user IP packets transmitted over the LTE RAT may be transferred through the SGW 235, which may be connected to the PDN-GW 240 over an S5 signaling interface and the MME over an S11 signaling interface, and the LTE-WLAN base station network equipment 105-a. The SGW 235 may reside in the user plane and act as a mobility anchor for inter-eNB handovers and handovers between different access technologies. The PDN-GW 240 may provide UE IP address allocation as well as other functions.

The PDN-GW 240 may provide connectivity to one or more external packet data networks, such as IP network 245, over an SGi signaling interface. The IP network 245 may include the Internet, an Intranet, an IP Multimedia Subsystem (IMS), a Packet-Switched (PS) Streaming Service (PSS), and/or other types of PDNs.

In the present example, user plane data between the UE 115-a and the EPC 130-a may traverse the same set of one or more EPC bearers 250, irrespective of whether the traffic flows over the LTE or WLAN radio link. Signaling or control plane data 255 related to the set of one or more EPC bearers 250 may be transmitted between the LTE radio 205 of the UE 115-a and the MME 225 of the EPC, by way of the eNB element 215 of the LTE-WLAN base station network equipment 105-a. Thus, a link or coupling between the WLAN radio 210 of the UE 115-a and a WLAN access point element 220 may be used to carry data related to an EPC bearer if the WLAN access point element 220 is collocated or otherwise in high-speed communication with an eNB element 215 handling the control plane data 255 for that bearer. Conversely, if the WLAN access point serving the UE 115-a is not associated or directly coupled with the eNB element 215, traffic sent by the UE 115-a over WLAN may not have a way to reach the EPC bearer. Alternatively, there may be a path for WLAN traffic from the UE 115-a to the EPC bearer, but such a path may include a backhaul between the WLAN access point serving the UE 115-a and the eNB element 215, which may cause large delays or low throughput and result in poor user experience.

For this reason, if the UE 115-a is currently communicating EPC bearer data with an LTE-WLAN base station network equipment 105-a using an aggregation of an LTE carrier and a WLAN carrier, as shown in FIG. 2, a handover on the LTE side may cause a disruption to the data path on the WLAN side because the EPC bearer may be reconfigured to originate at the target cell of the LTE handover. Similarly, a handover on the WLAN side may cause a disruption to the data path on the WLAN side because the EPC bearer may not be available to the target WLAN access point of the WLAN handover. In either of these cases, traffic related to the EPC bearer sent by the UE over the WLAN link following the handover may be dropped at the WLAN access point, as the bearer may not be available at the WLAN access point currently associated with the UE 115-a. This loss of data packets may result in poor user experience.

Figure 3A:
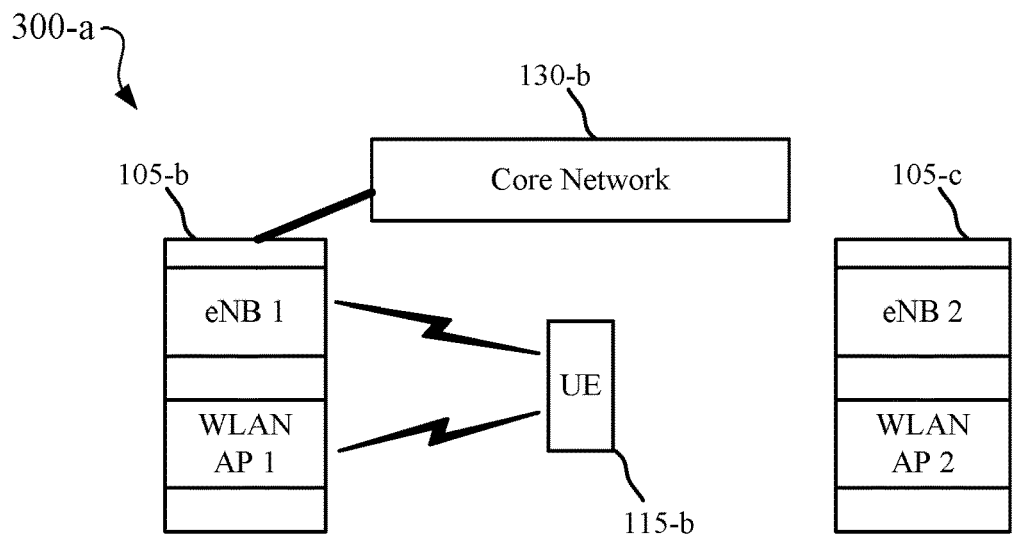
FIGS. 3A, 3B, and 3C show a block diagrams of an illustrative wireless communications system before and after a handover event.
Figure 3B:
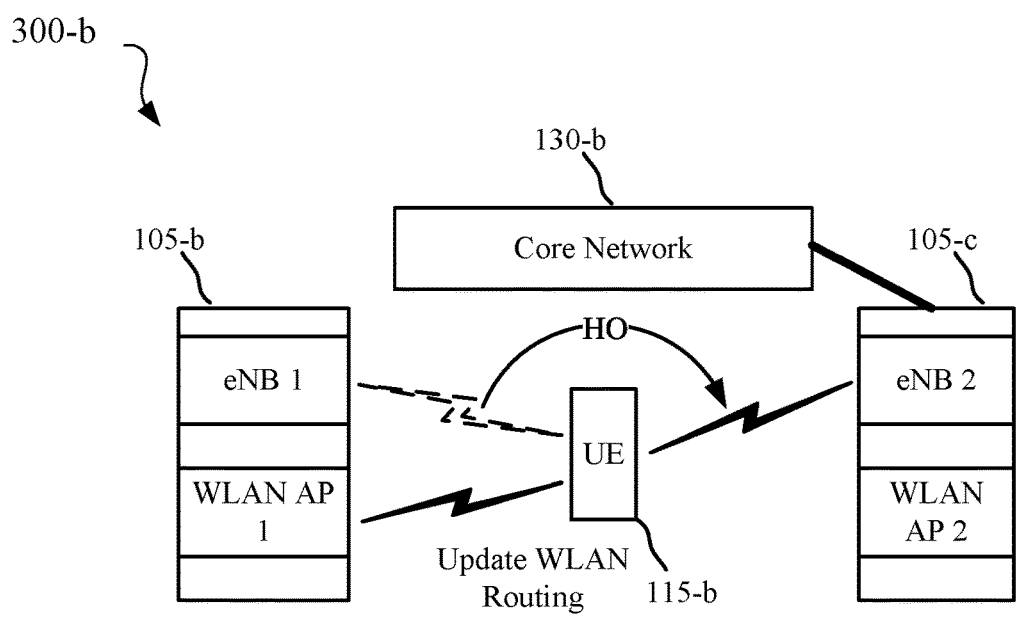
Figure 3C:
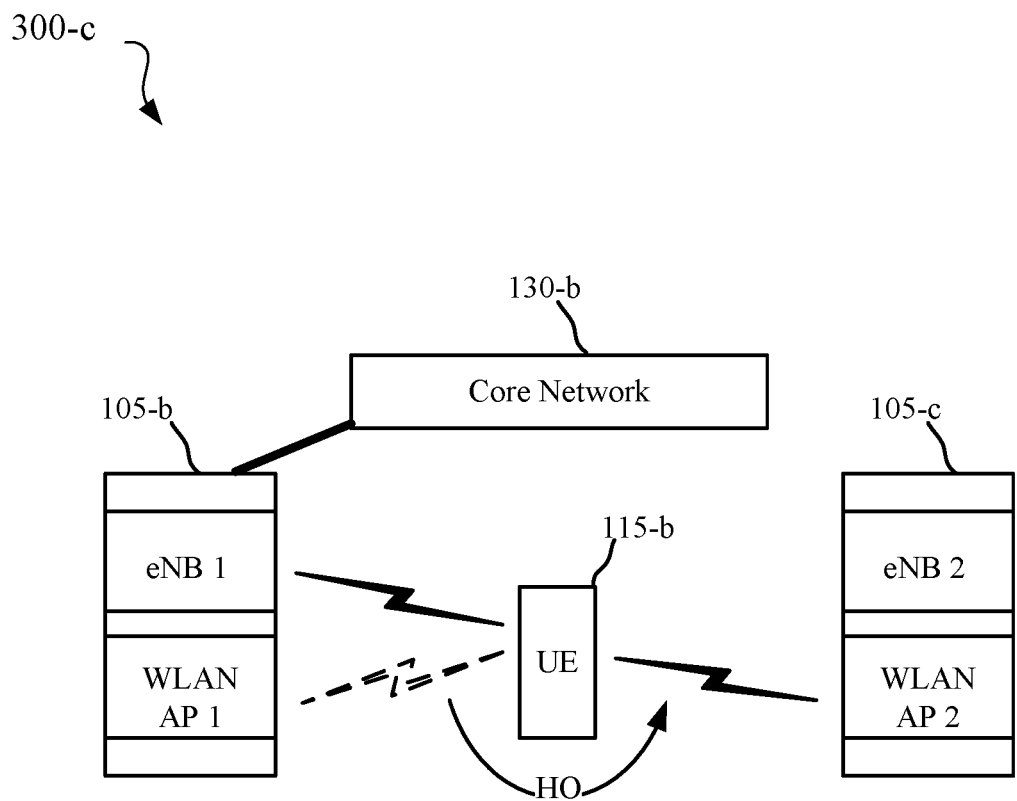

Referring now to FIGS. 3A, 3B, and 3C diagrams of a wireless communications system 300 are shown before and after a handover event, respectively. The wireless communications system 300 may include a UE 115-b, a first LTE-WLAN base station network equipment 105-b, a second LTE-WLAN base station network equipment 105-c, and a core network 130-b. The UE 115-b may be an example of one or more of the UEs 115 described above with reference to the previous Figures. The LTE-WLAN base station network equipments 105-b, 105-c may be examples of one or more of the base station network equipments 105 described above with reference to the previous Figures. The core network 130-b may be an example of one or more of the core networks 130 described above with reference to the previous Figures.

Referring specifically to FIG. 3A, before a handover event occurs, the UE 115-b may communicate with an eNB 1 element and a WLAN access point 1 element of the first LTE-WLAN base station network equipment 105-b. The UE 115-b may communicate data supported by the same one or more EPC bearers over both LTE and WLAN RATs according to an aggregation of at least one LTE carrier with at least one WLAN carrier. As discussed above, the EPC bearer(s) may be set up at the eNB 1 element of the LTE-WLAN base station network equipment 105-b such that control signaling related to the EPC bearer(s) may be communicated between UE 115-b and the core network 130-b using the LTE RAT, while user plane data related to the EPC bearer(s) may be communicated between the UE 115-b and the core network 130-b using the LTE and/or WLAN RATs.

Referring now specifically to FIG. 3B, the LTE wireless link between the UE 115-b and the eNB 1 element of the first LTE-WLAN base station network equipment 105-b may be handed over from the eNB 1 element of the first LTE-WLAN base station network equipment 105-b to the eNB 2 element of the second LTE-WLAN base station network equipment 105-c. While the target of the handover is shown as the second LTE-WLAN base station network equipment 105-c in the present example, it will be understood that the target of the handover need not be a base station network equipment having collocated and/or cooperative WWAN and WLAN elements. In other examples, the target of the handover from the eNB 1 element may be a base station network equipment implementing only an LTE eNB or other WWAN base station, or base station network equipment with WWAN and WLAN elements that do not support inter-RAT aggregation.

At least one of the UE 115-b, the first LTE-WLAN base station network equipment 105-b, or the second LTE-WLAN base station network equipment 105-c may detect a handover event indicating that the handover is about to occur or has already occurred. Based on this detected handover event and the identified coupling between the LTE and WLAN RATs, network traffic routing rules of one or more nodes of the wireless communications system 300 may be adapted. That is, at least one of the UE 115-b, the first LTE-WLAN base station network equipment 105-b, or the second LTE-WLAN base station network equipment 105-c may update routing rules for EPC bearer-related traffic between the UE 115-b and the core network 130-b. The updated routing rules may direct EPC bearer traffic that would have been associated with WLAN prior to the handover back to LTE, thereby avoiding a loss of packets and reduced user experience following the handover.

As discussed, the determination of the handover may occur when a handover event is identified either before or after the actual handover. In examples where the handover event indicates that a handover is imminent, but has not yet occurred, the network traffic routing rules may be updated to move WLAN traffic related to the EPC bearer(s) to the LTE carrier before the handover, thereby avoiding disruptions caused by the handover. In examples where the handover event indicates that the handover has already occurred, the network traffic routing rules may be updated to move WLAN traffic related to the bearer(s) to the LTE carrier or to a new WLAN carrier.

In certain examples, the handover event may include a measurement report from the UE 115-*b* transmitted to and identified by the first LTE-WLAN base station network equipment 105-*b*. The measurement report may, for example, indicate that the signal strength of a neighboring network equipment or cell (i.e., a potential handover target), in this case the second LTE-WLAN base station network equipment 105-*c*, is higher than that of the first LTE-WLAN base station network equipment 105-*b*.

In additional or alternative examples, the handover event may include a handover instruction from the first LTE-WLAN base station network equipment 105-*b*, as received and identified by the UE 115-*b*. In certain examples, this handover command may include a Radio Resource Control (RRC) connection reconfiguration message instructing the UE 115-*b* to initiate a handover to a specified target cell, in this case the second LTE-WLAN base station network equipment 105-*c*. The handover command may be in response to the transmission of the above described measurement report by the UE 115-*b*.

In additional or alternative examples, the handover event may include the preparation for or commencement of the cellular handover process, as identified at the UE 115-*b* or the first LTE-WLAN base station network equipment 105-*b*. In still further examples, the handover event may include a radio link failure (RLF) of the current serving cell (i.e., the eNB 1 element of the first LTE-WLAN base station network equipment 105-*b*), which may indicate an imminent or complete cellular handover of the UE 115-*b*. In additional or alternative examples, the handover event may include a determination that a quality of service (QoS) associated with the LTE RAT has fallen below a threshold. For example, if the UE 115-*b* or first LTE-WLAN base station network equipment 105-*b* determines that the QoS of the LTE RAT has fallen below a guaranteed QoS level associated with the EPC bearer, the UE 115-*b* or first LTE-WLAN base station network equipment 105-*b* may infer that an LTE handover at the LTE RAT is imminent.

In additional or alternative examples, the handover event may include a message from the UE 115-*b*, the first LTE-WLAN base station network equipment 105-*b*, or the second LTE-WLAN base station network equipment 105-*c* to one or more of the other nodes involved in the handover, the message indicating that the handover is about to occur or has already occurred.

Referring now specifically to FIG. 3C, in additional or alternative examples, an identified handover event may relate to the occurrence or imminence of a WLAN handover. In such examples the handover event may include detection, by the UE 115-*b* or first LTE-WLAN base station network equipment 105-*b*, that a target WLAN access point is more suitable than a current WLAN access point (i.e., the WLAN access point element of the first LTE-WLAN base station network equipment 105-*b*). The target WLAN access point may be determined to be more suitable based on, for example, a lower channel utilization, a higher channel quality, a faster backhaul, and/or a lower financial cost of service.

Once the handover event has been identified at the UE 115-*b* or one of the LTE-WLAN base station network equipments 105, a determination may be made at the UE 115-*b* or one of the LTE-WLAN base station network equipments 105 that the handover indicated by the handover event affects the transmission of traffic related to the same bearer between the UE 115-*b* and the core network 130-*b* over both LTE and WLAN RATs. Based on this determination and the handover event, the network traffic routing rules of one or more components of the wireless communications system 300 may be adapted. In many cases, the network traffic routing rules may be adapted to move WLAN traffic related to the bearer(s) to LTE.

In certain examples, the network traffic routing may be adapted by modifying a network layer (e.g., Internet Protocol) routing table for one or more of the UE 115-*b*, the first LTE-WLAN base station network equipment 105-*b*, the second LTE-WLAN base station network equipment 105-*c*. Network layer routing tables may include multiple entries, with each entry advertising a path to a destination IP address or range of IP addresses and a cost associated with the advertised path. The UE 115-*b* may therefore modify its routing table such that none of the entries associated with uplink traffic related to the EPC bearer(s) in question advertise a route through the WLAN interface of the UE 115-*b*. Similarly, one or both of the LTE-WLAN base station network equipment 105 may modify their routing tables such that none of the entries associated with downlink traffic related to the EPC bearer(s) in question advertises a route through the WLAN interface of the LTE-WLAN base station network equipment 105. In still other examples, the UE 115-*b* may modify its routing table such that an advertised cost associated with the routes through the WLAN interface of the UE 115-*b* is adjusted.

Additionally or alternatively, the network traffic routing may be adapted at one or more other layers of the network protocol stack in response to the detected handover event. For example, the network traffic routing may be adapted by modifying at least one central scheduling rule at the UE to ensure that no uplink traffic related to the bearer(s) in question is scheduled for transmission over the WLAN RAT (i.e., added to a WLAN transmit queue). Additionally or alternatively, at least one scheduling rule may be modified at one or more of the LTE-WLAN base station network equipment 105 to ensure that no downlink traffic related to the bearer(s) in question is scheduled for transmission over the WLAN RAT.

In additional or alternative examples, if the detected handover event indicates that the handover has not yet occurred, the network traffic routing may be adapted by the UE 115-*b* or one of the LTE-WLAN base station network equipment 105 delaying the handover until after a transmission of pending network traffic at the UE 115-*b* or first LTE-WLAN base station network equipment 105-*b* that has already been routed to the second RAT.

In additional or alternative examples, the UE 115-*b* may adapt the network traffic routing by disassociating the UE 115-*b* from the WLAN AP 1 element of the first LTE-WLAN base station network equipment 105-*b*, initiating a WLAN handover of the UE 115-*b* (e.g., from WLAN AP 1 element of the first LTE-WLAN base station network equipment 105-*b* to the WLAN AP 2 element of the second LTE-WLAN base station network equipment 105-*c*), or deactivating WLAN at the UE 115-*b*.

In certain examples, the UE 115-*b* may transmit WLAN traffic associated with an EPC bearer over a first WLAN port, and other WLAN traffic (e.g., direct Internet or LAN connectivity) over a second WLAN port. In such cases, the functionality of identifying a handover event, determining that a handover indicated by the handover event would affect the aggregation of WLAN and WWAN traffic supported by the same EPC bearer, and adapting network traffic routing based on the identified handover event may be performed for the first port and not the second port. That is, the above described functionality may, in certain examples, only apply to EPC-bearer related WLAN traffic between the UE 115-*b* and the core network 130-*a*, but not other WLAN traffic of the UE 115-*b*. Thus, where WLAN traffic is associated with a set of ports at the UE 115-*b*, the network traffic routing may be adapted for only a subset of the set of ports in response to the handover event.

Figure 4:
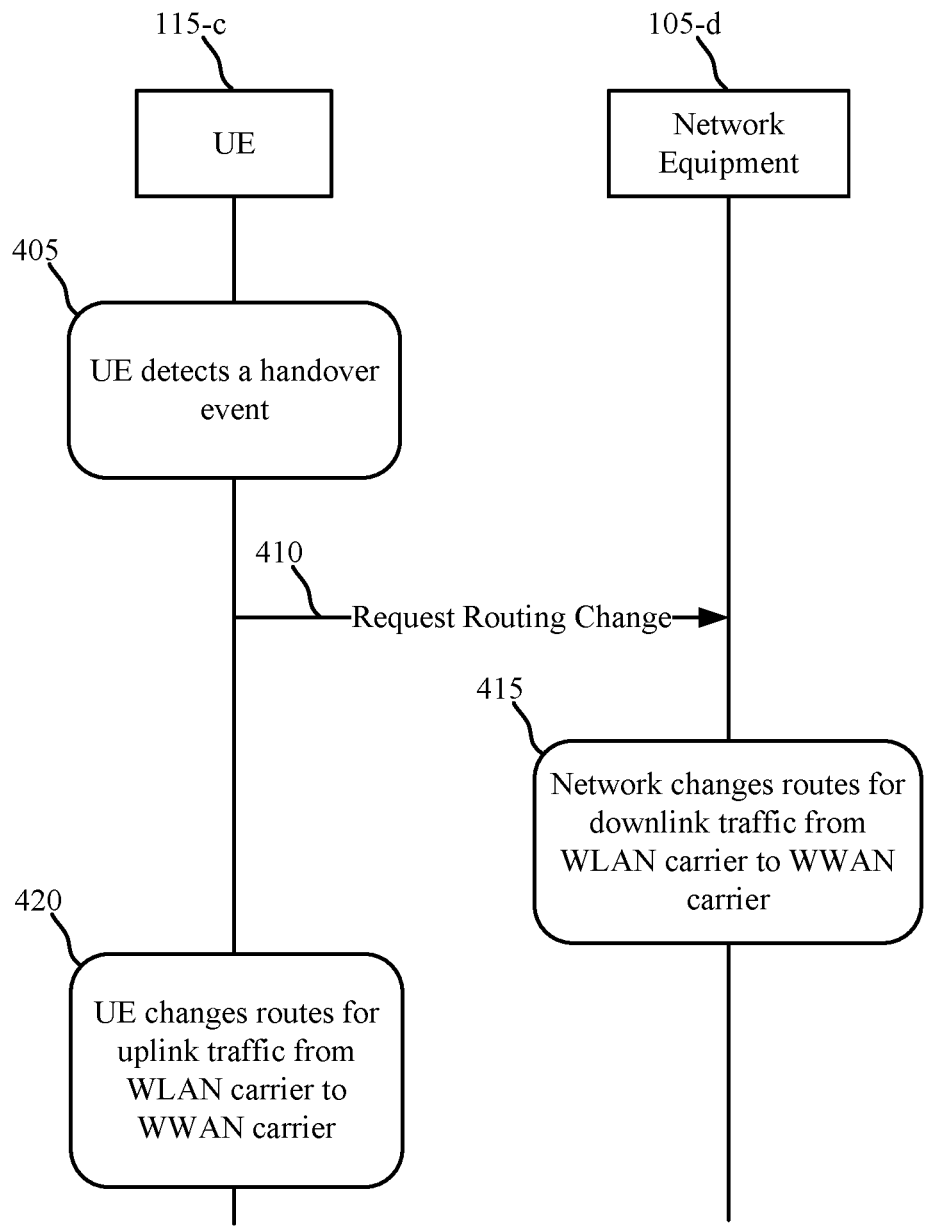
FIG. 4 shows a diagram of an illustrative process for routing modification in a wireless system.

Referring now to FIG. 4 in the context of the above examples, if the identification of a handover event occurs at a UE 115-*c* and the adaptation of the network traffic routing includes changes on the network side (e.g., for downlink traffic), the UE may send a message to a base station network equipment 105-*d* to trigger the network side routing change. FIG. 4 illustrates one example of a process 400 of triggering network side routing changes in response to an identified handover event. The UE 115-*c* and network equipment 105-*d* may be examples of one or more of the UEs 115 and network equipment 105 described above with reference to previous Figures.

At block 405, the UE 115-*c* may detect a handover event. It may be understood that the handover event may be either a cellular handover or WLAN handover event. In the illustrated example, the UE 115-*c* may identify a handover event indicating that a handover of the UE 115-*c* has occurred or is imminent for a cellular WWAN RAT implemented by the UE 115-*c*. In certain examples, prior to the handover event, the UE 115-*c* and network equipment 105-*d* may communicate traffic supported by the same one or more EPC bearer(s) over an aggregation or coupling of carriers from a first RAT (e.g., the cellular WWAN RAT) and a second RAT (e.g., a WLAN RAT). Based on the handover event and the identified coupling between the RATs, the UE 115-*c* may determine that the handover indicated by the handover event may detrimentally affect the ability of the UE 115-*c* to continue communicating network traffic supported by the same EPC bearers between the UE 115-*c* and the network equipment 105-*d* over both RATs. Thus, the UE 115-*c* may transmit a message 410 to the network equipment 105-*d* requesting a change in the network traffic routing. For example, the message 410 may request the network equipment 105-*d* to route all downlink traffic related to the EPC bearer over a carrier of the cellular WWAN RAT rather than the WLAN RAT.

At block 415, the network equipment 105-*d* may adapt the network traffic routing for downlink traffic related to the EPC bearer(s) from one or more WLAN RAT carriers to one or more of the WWAN RAT carriers. At block 420, the UE 115-*c* may adapt the network traffic routing for uplink traffic related to the EPC bearer(s) from one or more WLAN RAT carriers to one or more WWAN RAT carriers.

Figure 5:
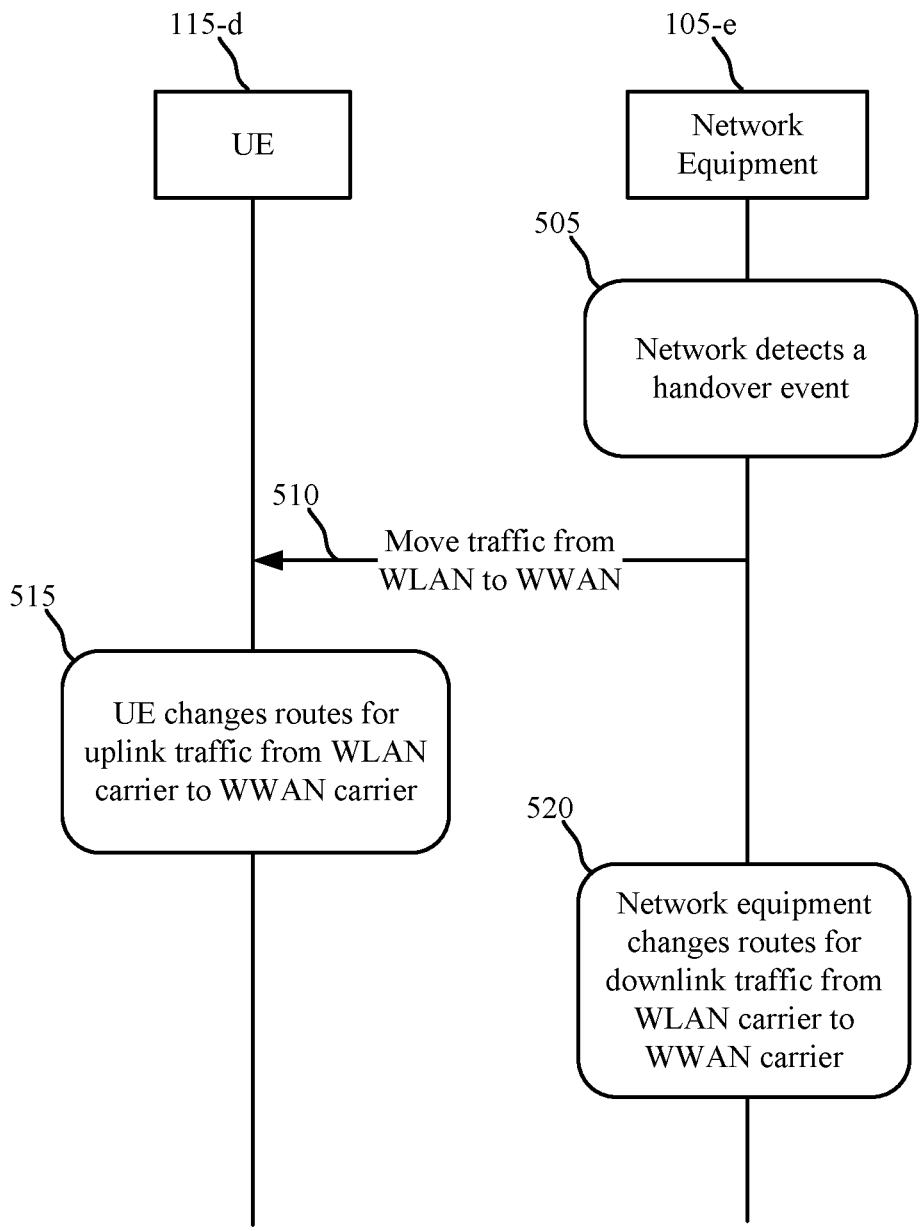
FIG. 5 shows a diagram of an illustrative process for routing modification in a wireless system.

Referring now to FIG. 5 in the context of the above examples, if the identification of a handover event occurs at a network equipment 105-*e* and the adaptation of the network traffic routing includes changes on the UE side (e.g., for uplink traffic), the network equipment 105-*e* may send a message to the UE 115-*d* to trigger the UE-side routing change. FIG. 5 illustrates one example of a process 500 of triggering UE-side routing changes in response to an identified handover event. The UE 115-*d* and network equipment 105-*e* may be examples of one or more of the UEs 115 and network equipment 105 described above with reference to previous Figures.

At block 505, the network equipment 105-*e* may detect a handover event. It may be understood that the handover event may be either a cellular handover or WLAN handover event. In the illustrated example, the network equipment 105-*e* may identify a handover event indicating that a handover of the UE 115-*d* has occurred or is imminent for a cellular WWAN RAT implemented by the UE 115-*d*. In certain examples, prior to the handover event, the network equipment 105-*e* and UE 115-*d* may communicate traffic supported by the same one or more EPC bearer(s) over an aggregation or coupling of carriers from a first RAT (e.g., the cellular WWAN RAT) and a second RAT (e.g., a WLAN RAT). Based on the handover event and the identified coupling between the first and second RATs at the network equipment 105-*e*, the network equipment 105-*e* may determine that the handover indicated by the handover event may detrimentally affect the ability of the UE 115-*d* to continue communicating network traffic supported by the same EPC bearers over both RATs. Thus, the network equipment 105-*e* may transmit a message 510 to the UE 115-*d* requesting a change in the network traffic routing. For example, the message 510 may request the UE 115-*d* to route all uplink traffic related to the EPC bearer(s) over a carrier of the cellular WWAN RAT rather than the WLAN RAT.

At block 515, the UE 115-*d* may adapt the network traffic routing for uplink traffic related to the EPC bearer(s) from one or more WLAN RAT carriers to one or more of the WWAN RAT carriers. At block 520, the network equipment 105-*e* may adapt the network traffic routing for downlink traffic related to the EPC bearer(s) from one or more WLAN RAT carriers to one or more WWAN RAT carriers.

Figure 6:
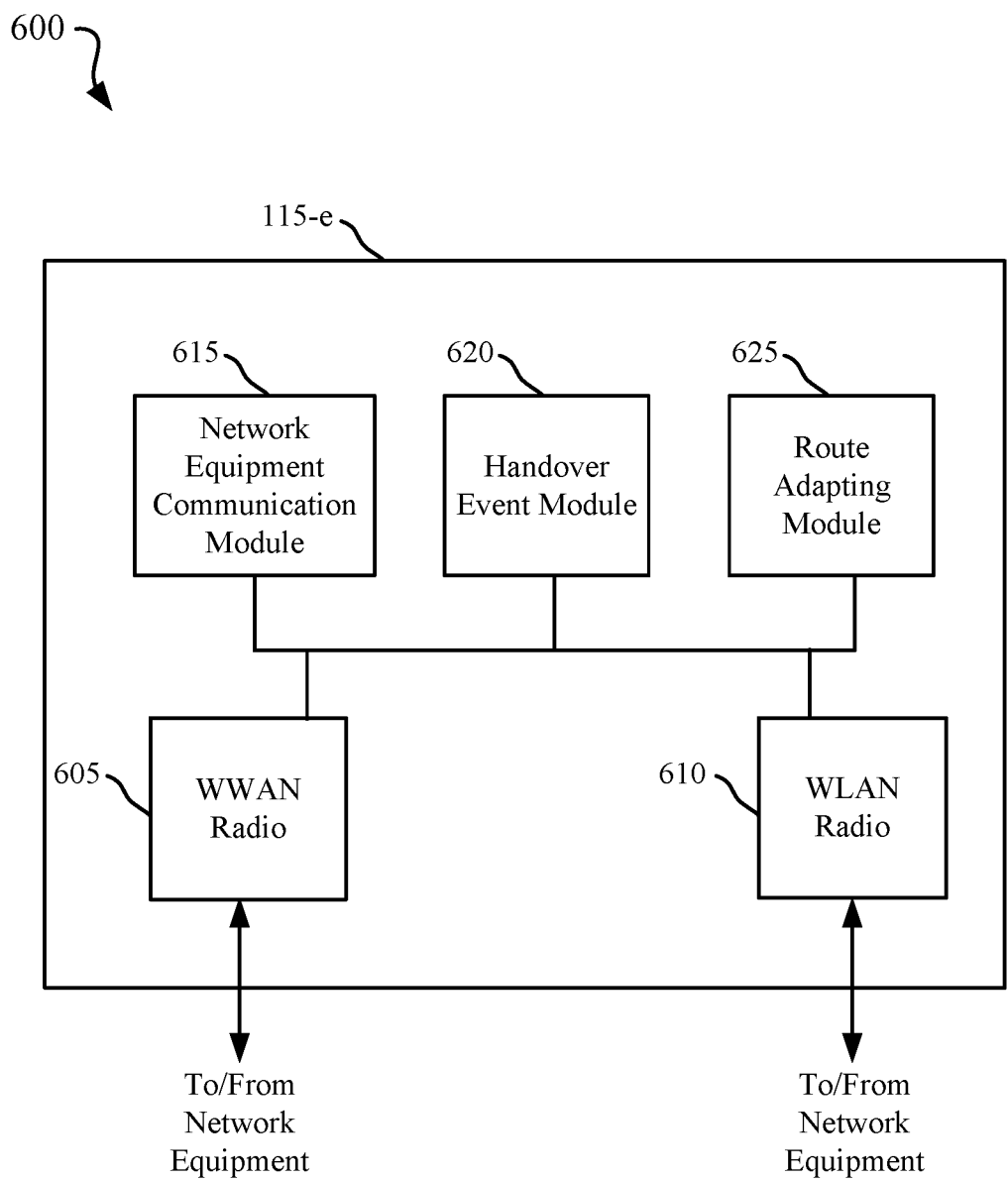
FIG. 6 shows a block diagram of an illustrative UE.

Referring now to FIG. 6, a block diagram 600 of an example multi-mode UE 115-*e* is shown. The UE 115-*e* may be an example of one or more of the UEs 115 described above with reference to the previous Figures. The UE 115-*e* may include a WWAN radio 605, a WLAN radio 610, a network equipment communication module 615, a handover event module 620, and a route adapting module 625. Each of these components may be in communication, directly or indirectly.

The WWAN radio 605 may be configured to communicate with network equipment (e.g., network equipment 105 of the previous Figures) over one or more carriers of a cellular WWAN RAT (e.g., LTE/LTE-A, eHRPD, EV-DO, 1×/HRPD, etc.). The WLAN radio 610 may be configured to communicate with network equipment over one or more carriers of a WLAN RAT.

The network equipment communication module 615 may be configured to establish communication between the UE and the network equipment over the WWAN RAT and the WLAN RAT. In particular, the network equipment communication module 615 may coordinate and schedule the communication of network traffic supported by the same EPC bearer or set of EPC bearers over the WWAN RAT and the WLAN RAT according to an aggregation or coupling of at least one WWAN carrier with at least one WLAN carrier identified by the network equipment communication module 615.

The handover event module 620 may be configured to identify a handover event associated with at least one of the RATs, according to the principles of the present specification. The handover event may indicate that a handover of the UE on one of the RATs has already occurred or is imminent. The handover event module 620 may further determine that the handover indicated by the handover event would affect the ability of the UE to continue communicating network traffic supported by the same EPC bearer(s) over both the first RAT and the second RAT.

The route adapting module 625 may be configured to adapt network traffic routing based at least in part on the identified handover event. The route adapting module 625 may adapt the network traffic routing at the UE 115-e by disengaging the coupling between the first and second RATs when a target of the handover event does not support the use of a common bearer to convey traffic for both RATs. Disengaging the coupling may include routing all traffic associated with the common bearer over one of the RATs. Additionally or alternatively, the route adapting module 625 may adapt the network traffic routing at the UE 115-e by modifying a network layer (e.g., IP layer) routing table stored by the UE, modifying at least one sub-IP layer scheduling rule associated with distributing uplink traffic between the UE and the core network among WWAN and WLAN, or take other appropriate measures to modify network traffic routing at the UE. One or more of these measures may be taken in response to a determination of whether a target of the handover of the first RAT supports the use of a common bearer to convey traffic for the UE over both the first and second RATs. The route adapting module 625 may additionally or alternatively be configured to request or instruct the network equipment to adapt its traffic routing to direct network traffic associated with the EPC bearers over only one of the WWAN or the WLAN. In certain examples, the route adapting module 625 may perform data retransmissions prior to adapting the network traffic routing.

Figure 7:
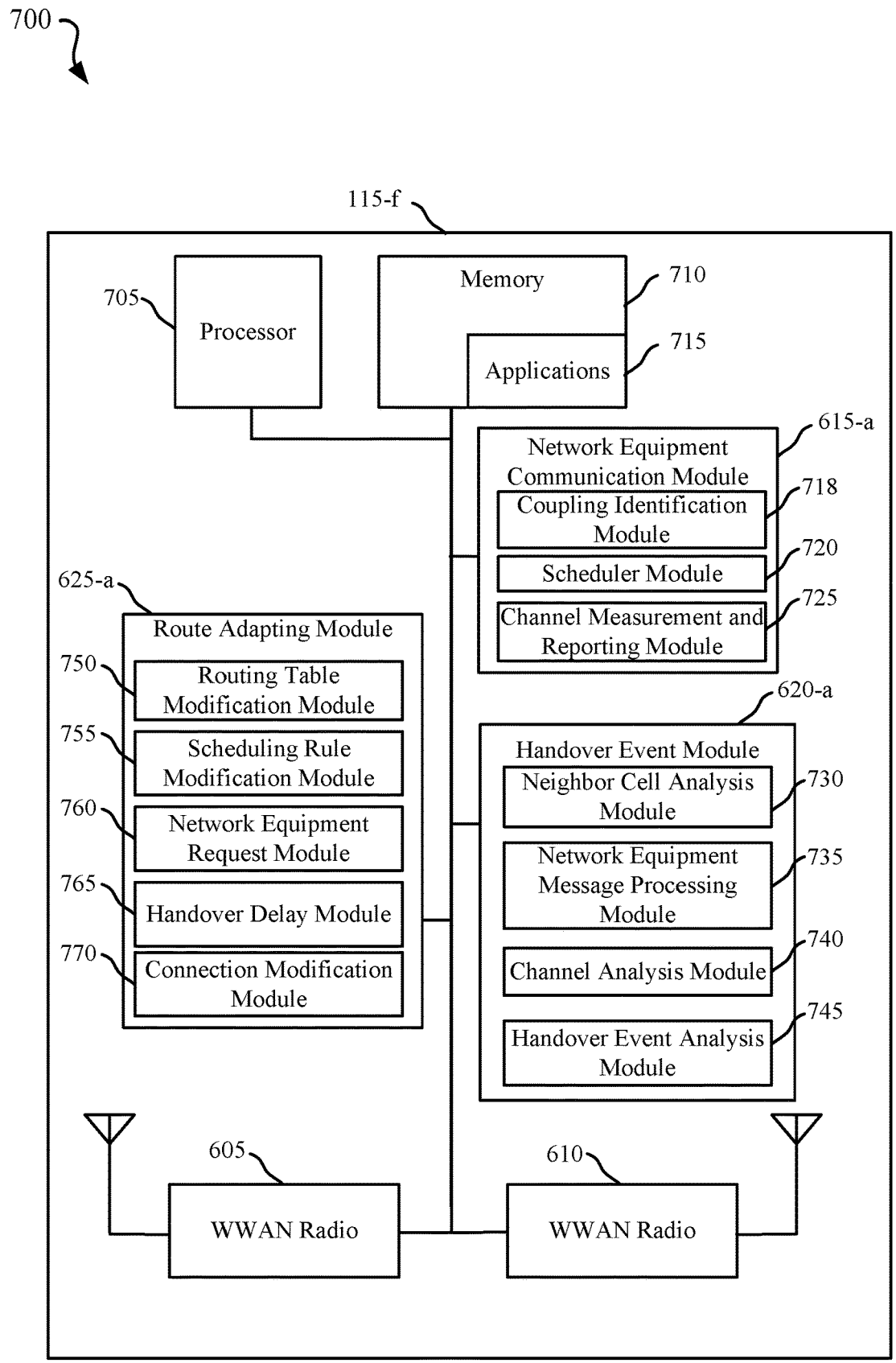
FIG. 7 shows a block diagram of an illustrative UE.

Referring now to FIG. 7, a block diagram 700 of a more detailed example of a multi-mode UE 115-f is shown. The UE 115-f may be an example of one or more of the UEs 115 described above with reference to the previous Figures. The UE 115-f may include a WWAN radio 605, a WLAN radio 610, a network equipment communication module 615-a, a handover event module 620-a, a route adapting module 625-a, a processor 705, and a memory 710. Each of these components may be in communication, directly or indirectly. In certain examples, the processor 705 may be configured to execute computer-readable program code stored on the memory 710 to execute one or more of the functions associated with the WWAN radio 605, the WLAN radio 610, the network equipment communication module 615-a, the handover event module 620-a, or the route adapting module 625-a. Additionally or alternatively, one or more functions associated with these components may be implemented by ASICs or other special- or general-purpose hardware arranged and interconnected to perform the functionality associated with each component.

The network equipment communication module 615-a may be configured to establish communication between the UE 115-f and the network equipment over the WWAN RAT using the WWAN radio 605 and over the WLAN RAT using the WLAN radio 610.

The network equipment communication module 615-a may include a coupling identification module 718 configured to identify a coupling of the WWAN RAT and the WLAN RAT in the communication between the UE 115-f and the network equipment. For example, the network equipment communication module 615-a may determine that network traffic communicated between the UE and the network equipment over the WWAN RAT and the WLAN RAT is supported by at least one common bearer. In certain examples, the coupling identification module 718 may identify a carrier aggregation of at least one carrier of the WWAN RAT with at least one carrier of the WLAN RAT. In additional or alternative examples, the coupling identification module 718 may identify the coupling of the WWAN RAT and the WLAN RAT based on a determination that the network equipment includes collocated wide area network (WAN) and wireless area network (WLAN) elements. In additional or alternative examples, the coupling identification module 718 may identify the coupling of the WWAN RAT and the WLAN RAT based on a unicast message received from the network equipment over one of the RATs, the message indicating the coupling between the WWAN RAT and the WLAN RAT. In additional or alternative examples, the coupling identification module 718 may identify the coupling of the WWAN RAT and the WLAN RAT based on a broadcast message received over one of the RATs, the message advertising the coupling between the WWAN RAT and the WLAN RAT.

The network equipment communication module 615-a may additionally include a scheduler module 720 and a channel measurement and reporting module 725. The scheduler module 720 may be configured to receive Radio Link Controller (RLC) packets related to one or more EPC bearers from a unified RLC layer and distribute the RLC packets between the WWAN radio 605 and the WLAN radio 610 for transmission to the network equipment according to the WWAN and WLAN protocols. The scheduler module 720 may implement one or more rules to distribute the RLC packets between the RATs. The channel measurement and reporting module 725 may measure channel conditions and parameters for one or both of the WWAN RAT or the WLAN RAT and report the measured channel conditions and parameters to the network equipment.

The handover event module 620-a may be configured to identify a handover event associated with at least one of the RATs. The handover event module 620-a may include a neighbor cell analysis module 730 configured to identify the handover event based on a determination that a neighboring cell has a better signal strength than a current WWAN or WLAN serving cell of the 115-f. Based on this determination, the neighbor cell analysis module 730 may determine that a handover to the neighbor cell is imminent.

The handover event module 620-a may further include a network equipment message processing module 735 configured to analyze one or more messages received from the network equipment and identify the handover event from the message(s). For example, the network equipment message processing module 735 may receive a handover instruction from the network equipment associated with the WWAN radio and determine, based on the instruction message, that a handover is about to occur. In certain examples, the handover instruction from the network equipment may be in response to a measurement report of channel conditions generated by the channel measurement and reporting module 725 and transmitted to the network equipment. The measurement report may include, for example, an indication that a neighboring cell has a better signal strength than the current serving cell associated with the UE 115-f Additionally or alternatively, the network equipment message processing module 735 may identify the handover event by receiving an indication that the handover event has occurred or is imminent from the network equipment.

The handover event module 620-a may further include a channel analysis module 740 configured to identify the handover event by detecting a radio link failure (RLF) of a current WWAN serving cell associated with the UE 115-f and infer that a handover or related connection of the UE 115-f to a new serving cell is imminent. Additionally or alternatively, the channel analysis module 740 may determine that the quality of service (QoS) associated with one or more of the RATs has fallen below a threshold, and determine that a handover of the UE on one of the RATs is consequentially imminent.

The handover event analysis module 745 may be configured to determine, based on the handover event, whether the handover indicated by the handover event will affect the ability of the UE 115-*f* to continue communicating the EPC bearer traffic over both WWAN and WLAN RATs at a current rate. This analysis, based on the handover event, may trigger the route adapting module 625-*a* to adapt network routing at the UE 115-*f* and/or the network equipment coupled with the UE 115-*f* to move EPC bearer traffic associated with the WLAN RAT over to the WWAN RAT.

The route adapting module 625-*a* may include a routing table modification module 750 configured to adapt add, delete, or modify one or more entries of a routing table stored at the UE 115-*f* to move all EPC bearer traffic to the WWAN RAT.

The route adapting module 625-*a* may further include a scheduling rule modification module 755 configured to add, delete, or modify one or more scheduling rules implemented by the scheduler module 720 to distribute uplink EPC bearer traffic between the UE and the EPC between the WWAN and WLAN RATs.

The route adapting module 625-*a* may further include a network equipment request module 760 configured to transmit a request to the network equipment to modify a routing of downlink traffic from the network equipment to the UE 115-*f* such that downlink bearer traffic associated with the WLAN RAT is moved to the WWAN RAT.

The route adapting module 625-*a* may further include a handover delay module 765 configured to delay the handover indicated by the handover event based on an amount of pending network data traffic that is to be transmitted over the WLAN RAT (e.g., until after a transmission of pending network traffic that has already been routed to the WLAN radio).

The route adapting module 625-*a* may further include a connection modification module 770 configured to modify a connection of the UE 115-*f* over the WLAN radio 610 in response to the handover indicated by the handover event. The connection modification may include disassociating the UE 115-*f* from the WLAN connection, initiating a handover of the UE 115-*f* over the WLAN RAT, and/or deactivating the WLAN RAT.

Figure 8:
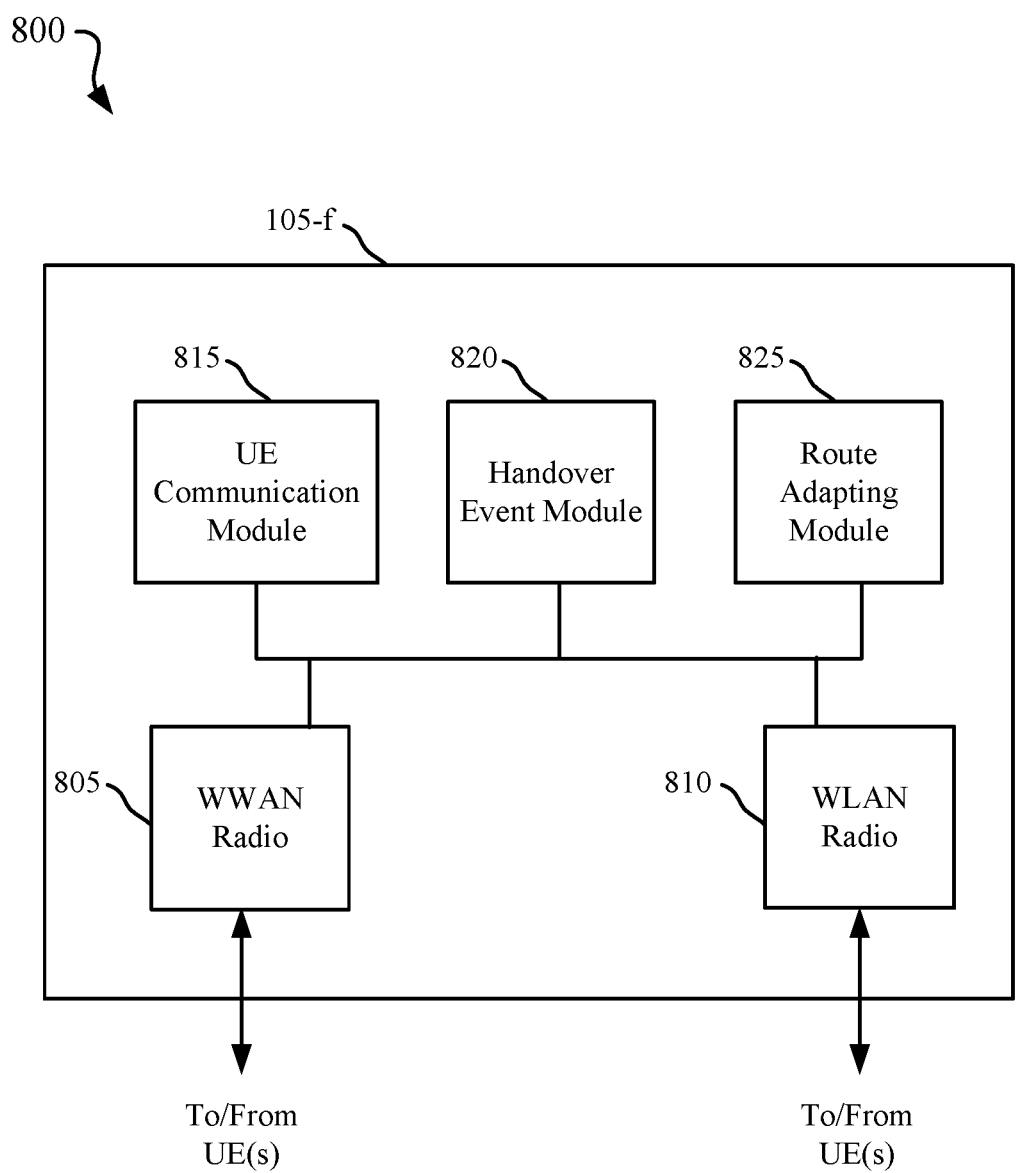
FIG. 8 shows a block diagram of illustrative base station network equipment.

Referring now to FIG. 8, a block diagram 800 of an example of a multi-mode network equipment 105-*f* is shown. The network equipment 105-*f* may be an example of one or more of the network equipment 105 described above with reference to the previous Figures. The network equipment 105-*f* may include a WWAN radio 805, a WLAN radio 810, a UE communication module 815, and a handover event module 820, and a route adapting module 825. Each of these components may be in communication, directly or indirectly.

The WWAN radio 805 may be configured to communicate with a UE (e.g., UE 115 of the previous Figures) over one or more carriers of a cellular WWAN RAT (e.g., LTE/LTE-A, eHRPD, EV-DO, 1×/HRPD, etc.). The WLAN radio 610 may be configured to communicate with the UE over one or more carriers of a WLAN RAT.

The UE communication module 815 may be configured to establish communication between the network equipment and the UE over the WWAN RAT and the WLAN RAT. In particular, the UE communication module 815 may coordinate and schedule the communication of network traffic related to the same EPC bearer or set of EPC bearers with the UE over the WWAN RAT and the WLAN RAT according to an aggregation or coupling of at least one WWAN carrier with at least one WLAN carrier identified by the UE communication module 815.

The handover event module 820 may be configured to identify a handover event associated with at least one of the RATs, according to the principles of the present specification. The handover event may indicate that a handover of the UE on one of the RATs has already occurred or is imminent. The handover event module 820 may further determine that the handover indicated by the handover event would affect the ability of the network equipment to continue communicating network traffic supported by the same EPC bearer(s) over both the first RAT and the second RAT.

The route adapting module 825 may be configured to adapt network traffic routing based at least in part on the identified handover event. The route adapting module 825 may adapt the network traffic routing at the network equipment 105-*f* by disengaging the coupling between the first and second RATs when a target of the handover event does not support the use of a common bearer to convey traffic for both RATs. Disengaging the coupling may include routing all traffic associated with the common bearer over one of the RATs. Additionally or alternatively, the route adapting module 825 may adapt the network traffic routing at the network equipment 105-*f* by modifying a network layer (e.g., IP layer) routing table stored by the network equipment 105-*f*, modifying at least one sub-IP layer scheduling rule associated with distributing downlink traffic from a core network among WWAN and WLAN, or take other appropriate measures to modify network traffic routing at the network equipment 105-*f*. One or more of these measures may be taken in response to a determination of whether a target of the handover of the first RAT supports the use of a common bearer to convey traffic for the UE over both the first and second RATs. The route adapting module 825 may additionally or alternatively be configured to request or instruct the UE to adapt its network traffic routing to direct network traffic associated with the EPC bearers over only one of the WWAN or the WLAN.

Figure 9:
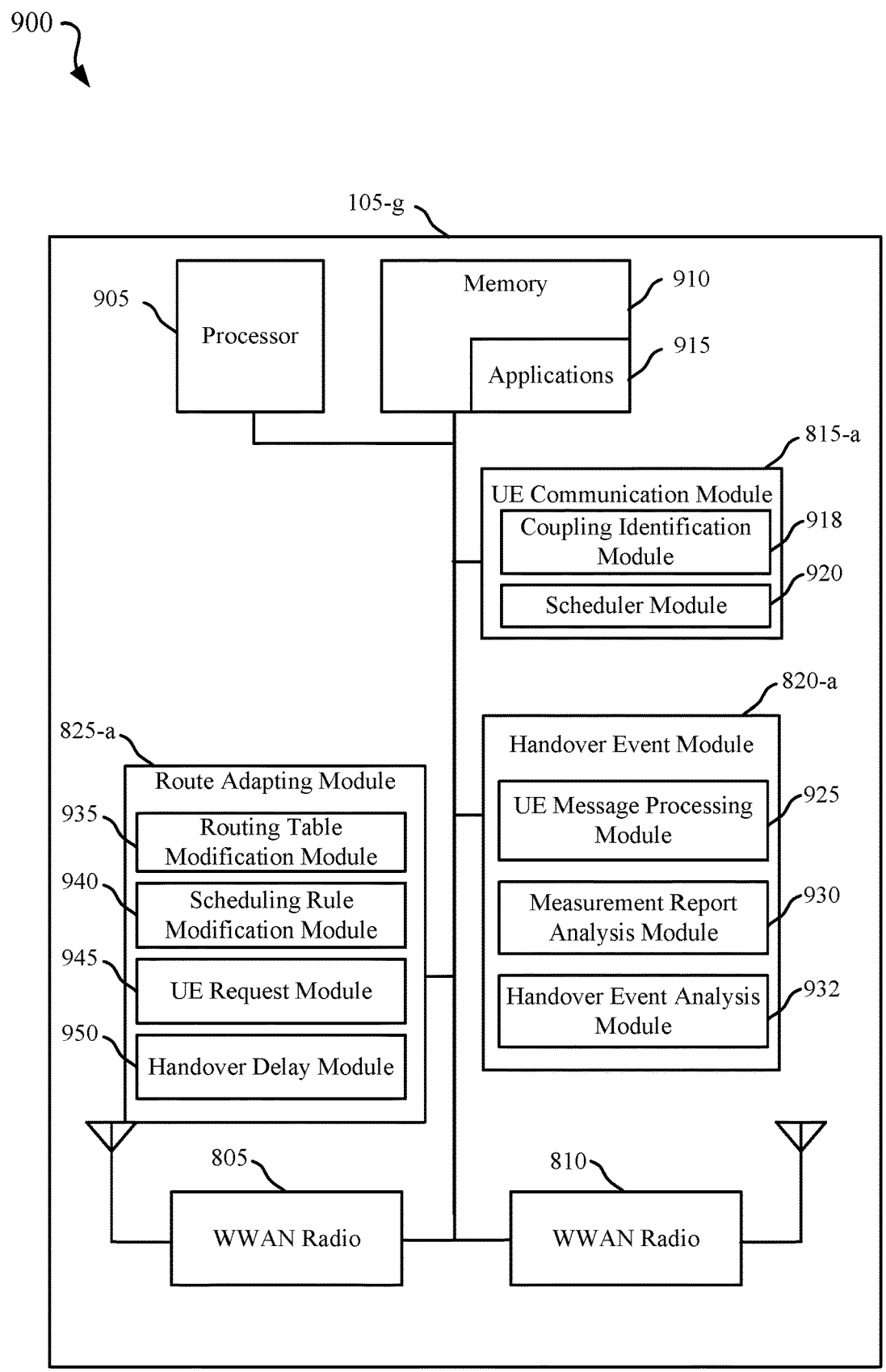
FIG. 9 shows a block diagram of illustrative base station network equipment.

Referring now to FIG. 9, a block diagram 900 of a more detailed example of a multi-mode network equipment 105-*g* is shown. The network equipment 105-*g* may be an example of one or more of the network equipment 105 described above with reference to the previous Figures. The network equipment 105-*g* may include a WWAN radio 805, a WLAN radio 810, a UE communication module 815-*a*, a handover event module 820-*a*, a route adapting module 825-*a*, a processor 905, and a memory 910. Each of these components may be in communication, directly or indirectly. In certain examples, the processor 905 may be configured to execute computer-readable program code stored on the memory 910 to execute one or more of the functions associated with the WWAN radio 805, the WLAN radio 810, the UE communication module 815-*a*, the handover event module 820-*a*, or the route adapting module 825-*a*. Additionally or alternatively, one or more functions associated with these components may be implemented by ASICs or other special- or general-purpose hardware arranged and interconnected to perform the functionality associated with each component.

The UE communication module 815-*a* may be configured to establish communication between the network equipment 105-*g* and the UE over the WWAN RAT using the WWAN radio 805 and over the WLAN RAT using the WLAN radio 810. The UE communication module 815-*a* may include a coupling identification module 918 configured to identify a coupling of the WWAN RAT and the WLAN RAT in the communication between the network equipment 105-*g* and the UE. For example, the coupling identification module 918 may determine that network traffic communicated between the network equipment 105-*g* and the UE over the first RAT and the second RAT is supported by at least one common bearer. In certain examples, the coupling identification module 918 may identify a carrier aggregation of at least one carrier of the WWAN RAT with at least one carrier of the WLAN RAT.

The UE communication module 815-*a* may additionally include a scheduler module 920. The scheduler module 920 may be configured to receive Radio Link Controller (RLC) packets related to one or more EPC bearers from a unified RLC layer and distribute the RLC packets between the WWAN radio 805 and the WLAN radio 810 for downlink transmission to the UE according to the WWAN and WLAN protocols. The scheduler module 920 may implement one or more rules to distribute the RLC packets between the RATs.

The handover event module 620-*a* may be configured to identify a handover event associated with at least one of the RATs. The handover event module 820-*a* may include a UE message processing module 925 configured to analyze one or more messages received from the UE and identify the handover event from the message(s). For example, the UE message processing module 925 may receive a measurement report of channel conditions for one or both of the RATs from the UE. A measurement report analysis module 930 may determine from the measurement report that a neighboring WWAN cell of the UE has a better signal strength than a current serving cell of the UE provided by the WWAN radio 805 of the network equipment 105-*g*. In response to this determination, the network equipment 105-*g* may determine that a WWAN handover of the UE is imminent. Additionally or alternatively, the UE message processing module 925 may, in response to the measurement report and/or for other reasons, transmit a handover instruction to the UE and determine, based on the transmission of the handover instruction message, that a handover is about to occur. In still other examples, the UE message processing module 925 may identify the handover event by receiving a message from the UE indicating that a handover of the UE has occurred or is imminent. In yet further examples, the UE message processing module 925 may receive a request from the UE to modify its routing table. In response, the UE message processing module 925 may instruct the route adapting module 825-*a* of the UE to comply with the request to modify the routing tables.

A handover event analysis module 932 of the handover event module 820-*a* may be configured to determine, based on the handover event, whether the handover indicated by the handover event will affect the ability of the network equipment 105-*g* to continue communicating the EPC bearer traffic over both WWAN and WLAN RATs at a current rate. This analysis, based on the handover event, may trigger the route adapting module 825-*a* to adapt network traffic routing at the network equipment 105-*g* and/or the UE to move EPC bearer traffic associated with the WLAN RAT over to the WWAN RAT.

The route adapting module 825-*a* may include a routing table modification module 935 configured to adapt add, delete, or modify one or more entries of a routing table stored at the network equipment 105-*g* to move downlink EPC bearer traffic from the WLAN RAT to the WWAN RAT.

The route adapting module 825-*a* may further include a scheduling rule modification module 940 configured to add, delete, or modify one or more scheduling rules implemented by the scheduler module 920 to distribute downlink EPC bearer traffic between among the WWAN and WLAN RATs.

The route adapting module 825-*a* may further include a UE request module 945 configured to transmit a request to the UE to modify a routing of uplink traffic from the UE to the network equipment 105-*g* such that uplink bearer traffic associated with the WLAN RAT is moved to the WWAN RAT.

The route adapting module 825-*a* may further include a handover delay module 950 configured to delay the handover indicated by the handover event until after a transmission of pending network traffic that has already been routed to the WLAN radio.

Figure 10:
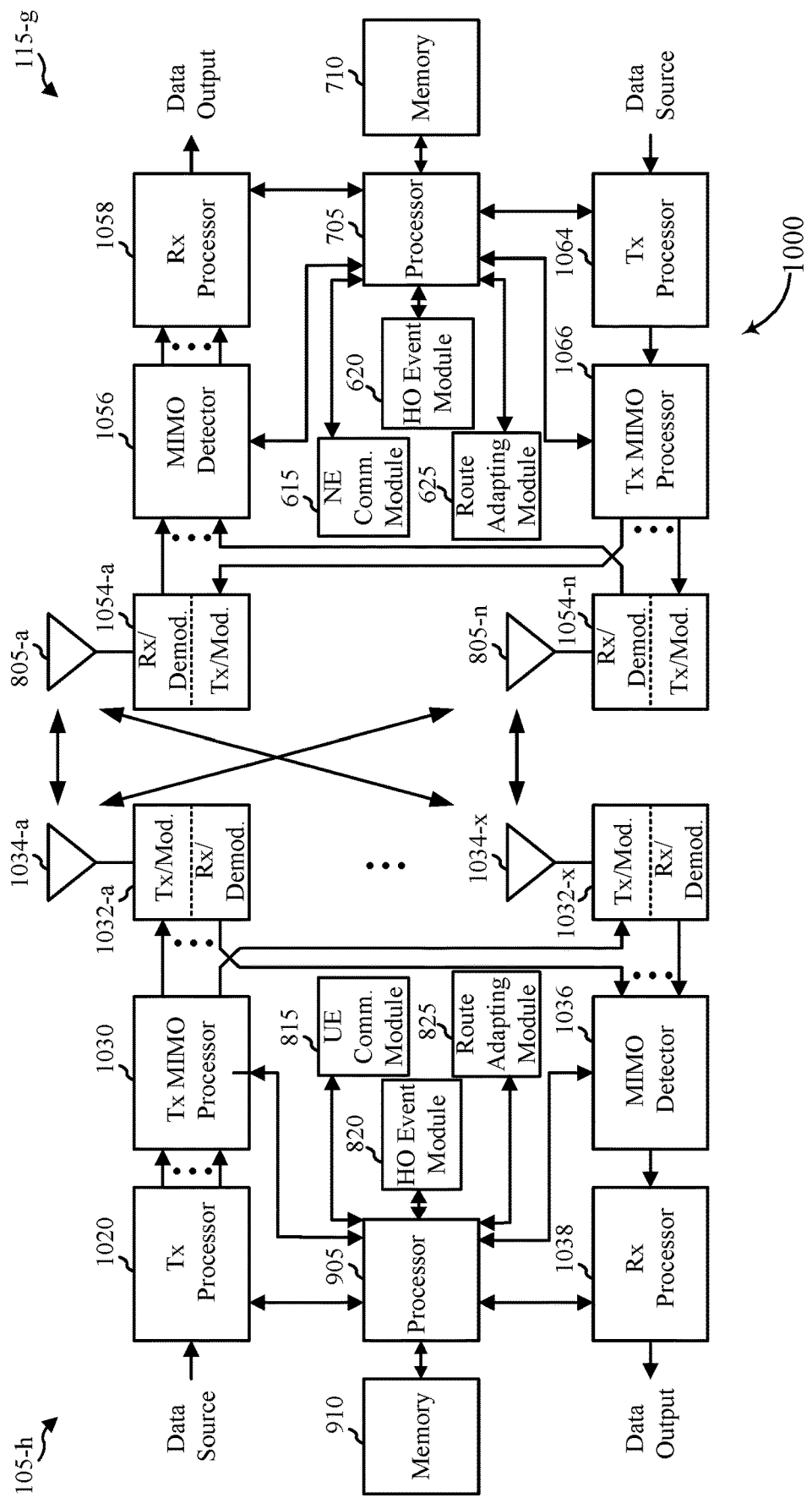
FIG. 10 shows a block diagram of an illustrative wireless communication system.

FIG. 10 is a block diagram of a wireless communications system 1000 including a network equipment 105-*h* and a UE 115-*g*. This wireless communications system 1000 may illustrate aspects of the systems and networks of the previous Figures. The network equipment 105-*h* may be equipped with antennas 1034-*a* through 1034-*x*, and the UE 115-*g* may be equipped with antennas 1052-*a* through 1052-*n*. In the wireless communications system 1000, the network equipment 105-*h* may be able to send data over multiple communication links at the same time. Each communication link may be called a "layer" and the "rank" of the communication link may indicate the number of layers used for communication. For example, in a 2×2 MIMO system where network equipment 105-*h* transmits two "layers," the rank of the communication link between the network equipment 105-*h* and the UE 115-*g* is two.

At the network equipment 105-*h*, a transmit processor 1020 may receive data from a data source. The transmit processor 1020 may process the data. The transmit processor 1020 may also generate reference symbols, and a cell-specific reference signal. A transmit (TX) MIMO processor 1030 may perform spatial processing (e.g., precoding) on data symbols, control symbols, and/or reference symbols, if applicable, and may provide output symbol streams to the transmit modulator/demodulators 1032-*a* through 1032-*x*. Each modulator/demodulator 1032 may process a respective output symbol stream (e.g., for OFDM, etc.) to obtain an output sample stream. Each modulator/demodulator 1032 may further process (e.g., convert to analog, amplify, filter, and upconvert) the output sample stream to obtain a downlink (DL) signal. In one example, DL signals from modulator/demodulators 1032-*a* through 1032-*x* may be transmitted via the antennas 1034-*a* through 1034-*x*, respectively.

Consistent with the foregoing principles, the network equipment 105-*h* may include a processor 905, memory 910, a UE communication module 815, a handover event module 820, and a route adapting module 825. The UE communication module 815 may be configured to establish communication between the UE 115-*g* and the network equipment 105-*h* over a first RAT and a second RAT and to identify a coupling between the first RAT and the second RAT in the communication between the UE 115-*g* and the network equipment 105-*h*. The handover event module 820 may be configured to identify a handover event associated with at least one of the RATs, and the route adapting module 825 may be configured to adapt network traffic routing based at least in part on the identified handover event.

At the UE 115-*g*, the UE antennas 1052-*a* through 1052-*n* may receive the DL signals from the network equipment 105-*h* and may provide the received signals to the modulator/demodulators 1054-*a* through 1054-*n*, respectively. Each modulator/demodulator 1054 may condition (e.g., filter, amplify, downconvert, and digitize) a respective received signal to obtain input samples. Each modulator/demodulator 1054 may further process the input samples (e.g., for OFDM, etc.) to obtain received symbols. A MIMO detector 1056 may obtain received symbols from all the modulator/demodulators 1054-*a* through 1054-*n*, perform MIMO detection on the received symbols if applicable, and provide detected symbols. A receive processor 1058 may process (e.g., demodulate, deinterleave, and decode) the detected symbols, providing decoded data for the UE 115-*g* to a data output, and provide decoded control information to processor 705, or memory 710.

Consistent with the foregoing principles, the UE 115-*g* may include processor 705, memory 710, a network equipment communication module 615, a handover event module 620, and a route adapting module 625. The network equipment communication module 615 may be configured to establish communication between the UE 115-*g* and the network equipment 105-*h* over a first RAT and a second RAT and to identify a coupling between the first RAT and the second RAT in the communication between the UE 115-*g* and the network equipment 105-*h*. The handover event module 620 may be configured to identify a handover event associated with at least one of the RATs, and the route adapting module 625 may be configured to adapt network traffic routing based at least in part on the identified handover event.

On the uplink (UL), at the UE 115-*g*, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054-*a* through 1054-*n* (e.g., for SC-FDMA, etc.), and be transmitted to the network equipment 105-*h* in accordance with the transmission parameters received from the network equipment 105-*h*.

At the network equipment 105-*h*, the UL signals from the UE 115-*g* may be received by the antennas 1034, processed by the modulator/demodulators 1032, detected by a MIMO detector 1036 if applicable, and further processed by a receive processor. The receive processor 1038 may provide decoded data to a data output and to the processor 1040. The components of UE 115-*g* may, individually or collectively, be implemented with one or more Application Specific Integrated Circuits (ASICs) adapted to perform some or all of the applicable functions in hardware. Each of the noted modules may be a means for performing one or more functions related to operation of the wireless communications system 1000. Similarly, the components of the network equipment 105-*h* may, individually or collectively, be implemented with one or more Application Specific Integrated Circuits (ASICs) adapted to perform some or all of the applicable functions in hardware. Each of the noted components may be a means for performing one or more functions related to operation of the wireless communications system 1000.

Figure 11:
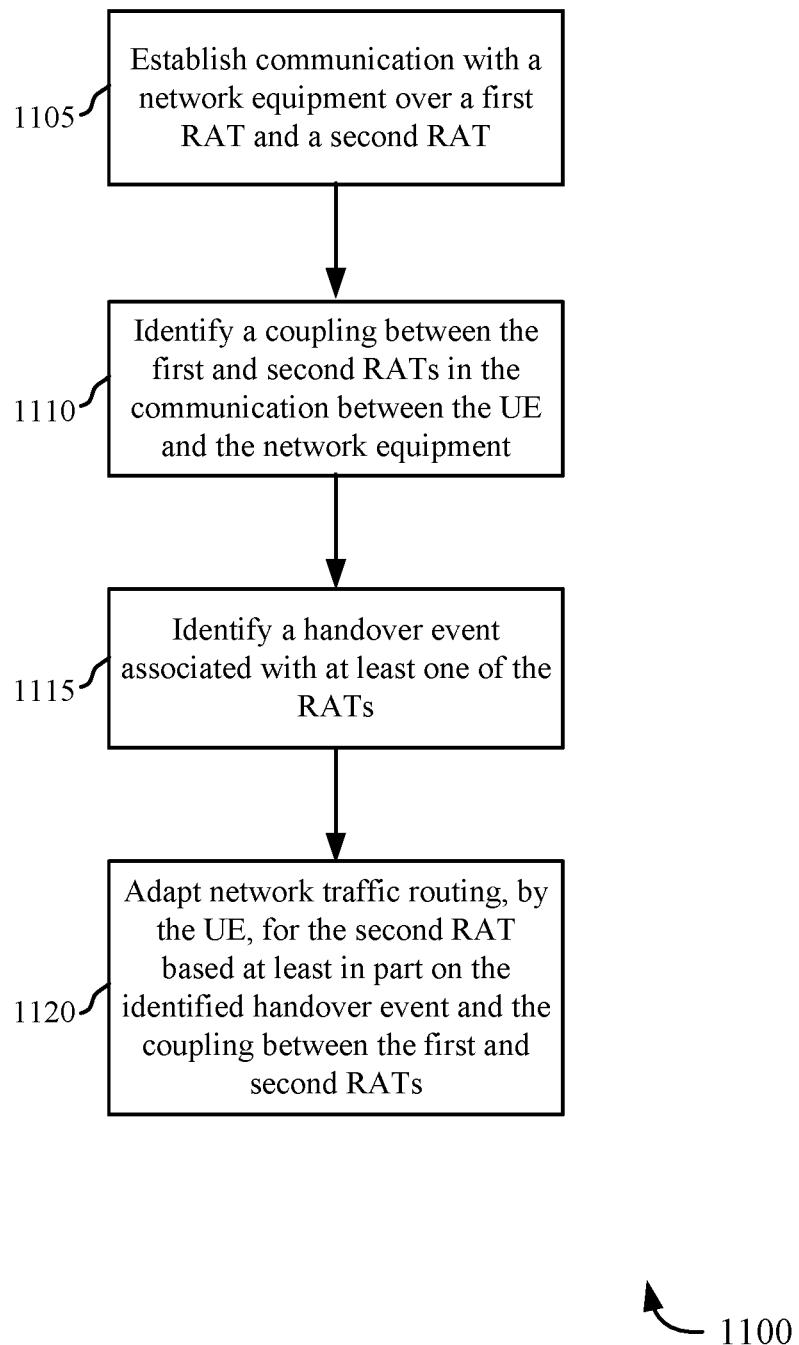
FIG. 11 shows a flowchart of an illustrative method for managing wireless communications.

FIG. 11 is a flow chart of an illustrative method 1100 of managing wireless communications in a wireless communication system. The method 1100 may be performed, for example, by one or more of the UEs 115 described above with reference to the previous Figures.

At block 1105, the UE may establish communication with network equipment over a first RAT and a second RAT. At block 1110, the UE may identify a coupling between the first RAT and the second RAT in the communication between the UE and the network equipment. For example, the UE may determine that network traffic communicated between the UE and the network equipment over both the first RAT and the second RAT is supported by a common set of one or more bearers. At block 1115, a handover event associated with at least one of the RATs may be identified at the UE. At block 1120, the UE may adapt network traffic routing based at least in part on the identified handover event and the coupling between the first and second RAT.

Figure 12:
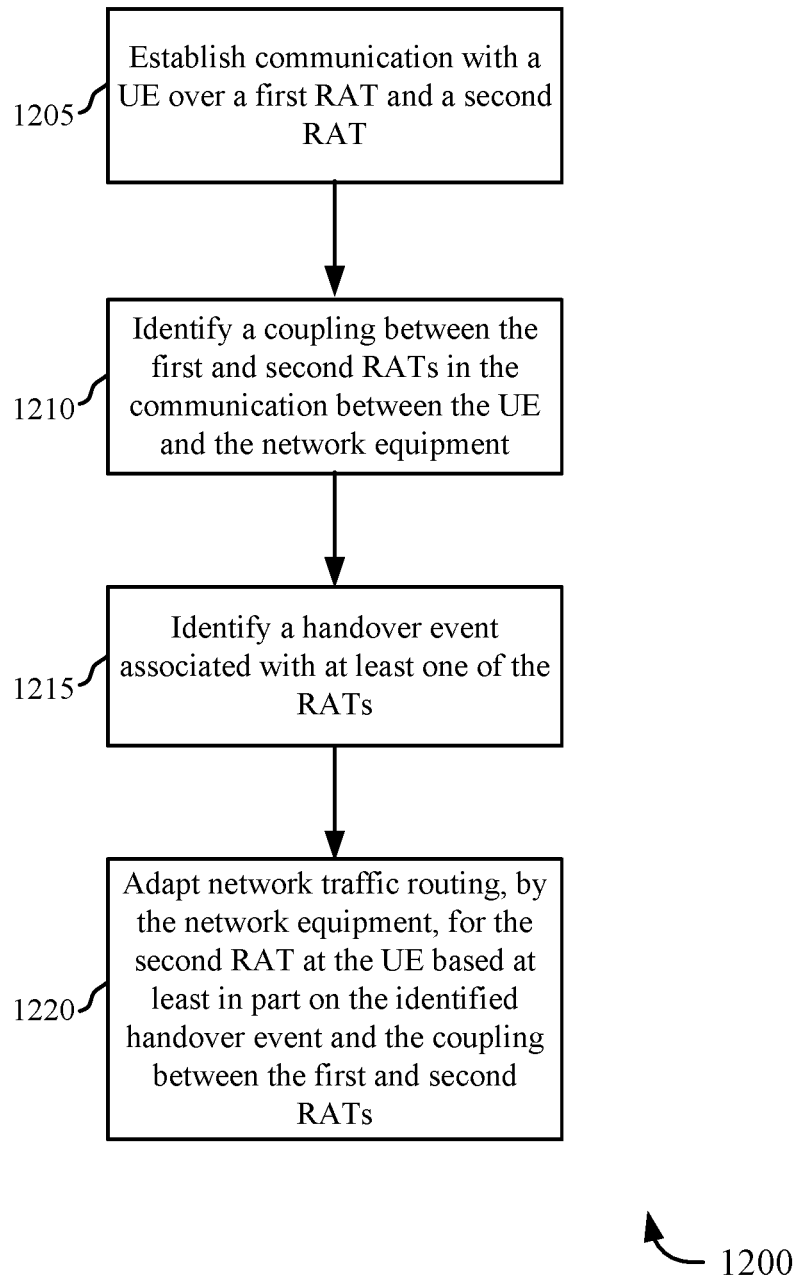
FIG. 12 shows a flowchart of an illustrative method for managing wireless communications.

FIG. 12 is a flow chart of an illustrative method 1200 of managing wireless communications in a wireless communication system. The method 1200 may be performed, for example, by one or more of the network equipment 105 described above with reference to the previous Figures.

At block 1205, the network equipment may establish communication with a UE over a first RAT and a second RAT. At block 1210, the network equipment may identify a coupling between the first RAT and the second RAT in the communication between the network equipment and the UE. For example, the network equipment may determine that network traffic communicated between the network equipment and the UE over both the first RAT and the second RAT is supported by a common set of one or more bearers. At block 1215, a handover event associated with at least one of the RATs may be identified at the network equipment. At block 1220, the network equipment may adapt network traffic routing based at least in part on the identified handover event and the coupling between the first and second RATs.

The detailed description set forth above in connection with the appended drawings describes exemplary embodiments and does not represent the only embodiments that may be implemented or that are within the scope of the claims. The terms "exemplary" or "illustrative" used throughout this description mean "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A computer readable storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communications by a user equipment, comprising:
   communicating with a first node over a first radio access technology (RAT) and a second node over a second RAT, the first RAT being different than the second RAT;
   receiving, from the first node, a unicast message indicating a coupling comprising a common bearer used to communicate uplink traffic with the first node over the first RAT and the second node over the second RAT;
   performing a handover from the second node to a target node;
   determining whether the common bearer is supported at the target node for uplink traffic communicated by the user equipment with the target node over the second RAT after the handover;
   adapting the uplink traffic communicated by the user equipment based on the determining, including disengaging the coupling and routing all uplink traffic associated with the common bearer to the first node only, or routing the uplink traffic associated with the common bearer to the first node and the target node; and
   communicating with the first node and the target node based on the adapting.

2. The method of claim 1, wherein the common bearer is not supported at the target node, and wherein disengaging the coupling comprises routing all uplink traffic associated with the common bearer to the first node only.

3. The method of claim 1, wherein the common bearer is supported at the target node, the method further comprising:
   utilizing at least one sub-IP layer scheduling rule to distribute uplink traffic associated with the common bearer to the first node and to the target node.

4. The method of claim 1, further comprising:
   modifying a connection of the user equipment with the second RAT in response to the handover.

5. The method of claim 4, wherein modifying the connection of the user equipment with the second RAT comprises at least one of: disassociating from the second RAT, initiating the handover, or deactivating use of the second RAT.

6. The method of claim 1, wherein the first node comprises a wireless wide area network (WWAN) node and the second node comprises a wireless local area network (WLAN) node.

7. The method of claim 1, wherein adapting the uplink traffic comprises moving all uplink traffic relating to the common bearer to the first node.

8. The method of claim 1, wherein performing the handover comprises receiving a radio resource control (RRC) reconfiguration message.

9. The method of claim 1, further comprising:
transmitting and receiving network traffic over a set of ports associated with one of the first RAT or the second RAT;
wherein the adapting the uplink traffic relates to a subset of the set of ports.

10. The method of claim 1, further comprising:
receiving the unicast message over one of the first RAT or the second RAT.

11. The method of claim 1, wherein the coupling is configured for the user equipment by at least one of the first node or the second node.

12. The method of claim 1, wherein determining whether the common bearer is supported at the target node comprises determining whether the uplink traffic is supported by the common bearer at the target node.

13. The method of claim 1, wherein the common bearer is used for simultaneous communication over the first RAT and the second RAT.

14. The method of claim 1, wherein adapting the uplink traffic comprises routing uplink traffic associated with the common bearer to the first node and the target node.

15. A user equipment, comprising:
a processor,
memory coupled with the processor; and
instructions stored in the memory and executable by the processor to:
communicate with a first node over a first radio access technology (RAT) and with a second node over a second RAT, the first RAT being different than the second RAT;
receive, from the first node, a unicast message indicating a coupling comprising a common bearer used to communicate uplink traffic with the first node over the first RAT and with the second node over the second RAT;
perform a handover from the second node to a target node;
determine whether the common bearer is supported at the target node for uplink traffic communicated by the user equipment with the target node over the second RAT after the handover;
adapt the uplink traffic communicated by the user equipment based on whether the common bearer is supported at the target node, including disengaging the coupling and routing all uplink traffic associated with the common bearer to the first node only, or routing the uplink traffic associated with the common bearer to the first node and the target node; and
communicate with the first node and the target node based on the adapting.

16. The user equipment of claim 15, wherein the common bearer is not supported at the target node and the instructions are executable by the processor to disengage the coupling and route all uplink traffic associated with the common bearer to only the first node.

17. The user equipment of claim 15, wherein the common bearer is supported at the target node and the instructions are executable by the processor to utilize at least one sub-IP layer scheduling rule to distribute uplink traffic associated with the common bearer to the first node and the target node.

18. The user equipment of claim 15, wherein the instructions are executable by the processor to:
modify a connection of the user equipment with the second RAT in response to the handover.

19. The user equipment of claim 18, wherein the instructions executable by the processor to modify the connection of the user equipment with the second RAT include at least one of: instructions to disassociate from the second RAT, instructions to initiate the handover, or instructions to deactivate use of the second RAT.

20. The user equipment of claim 15, wherein the instructions executable by the processor to adapt the uplink traffic include instructions to move all uplink traffic relating to the common bearer to the first node.

21. The user equipment of claim 15, wherein the first node comprises a wireless wide area network (WWAN) node and the second node comprises a wireless local area network (WLAN) node.

22. The user equipment of claim 15, wherein the instructions are executable by the processor to:
transmit and receive network traffic over a set of ports associated with one of the first RAT or the second RAT; and
adapt the uplink traffic for a subset of the set of ports.

23. The user equipment of claim 15, wherein the instructions are executable by the processor to:
receive the unicast message over one of the first RAT or the second RAT.

24. The user equipment of claim 15, wherein the instruction executable by the processor to perform the handover comprises instructions for receiving a radio resource control (RRC) reconfiguration message.

25. The user equipment of claim 15, wherein the coupling is configured for the user equipment by at least one of the first node or the second node.

26. The user equipment of claim 15, wherein the instructions executable by the processor to determine whether the common bearer is supported at the target node comprise instructions to determine whether the uplink traffic is supported by the common bearer at the target node.

27. The user equipment of claim 15, wherein the common bearer is used for simultaneous communication over the first RAT and the second RAT.

28. The user equipment of claim 15, wherein the instructions executable by the processor to adapt uplink traffic comprise instructions to route the uplink traffic associated with the common bearer to the first node and the target node.

29. A computer program product, comprising:
a non-transitory computer-readable medium storing instructions executable by a one or more processors of a user equipment to:
communicate with a first node over a first radio access technology (RAT) and with a second node over a second RAT, the first RAT being different than the second RAT;
receive, from the first node, a unicast message indicating a coupling comprising a common bearer used to communicate uplink traffic with the first node over the first RAT and with the second node over the second RAT;
perform a handover from the second node to a target node;
determine whether the common bearer is supported at the target node for uplink traffic communicated by the user equipment with the target node over the second RAT after the handover;

adapt the uplink traffic communicated by the user equipment based on whether the common bearer is supported at the target node, including disengaging the coupling and routing all uplink traffic associated with the common bearer to the first node only, or routing the uplink traffic associated with the common bearer to the first node and the target node; and
communicate with the first node and the target node based on the adapting.

* * * * *